(12) United States Patent
Goldsmith et al.

(10) Patent No.: US 10,921,115 B1
(45) Date of Patent: Feb. 16, 2021

(54) TOOL MEASURING DEVICE HAVING INDEPENDENT HEAD TILT AND ALIGNMENT AND HYBRID PANTOGRAPH-TO-OPTICAL INNER DIAMETER MEASUREMENT

(71) Applicant: Integrated Packaging Solutions, LLC, Wheatridge, CO (US)

(72) Inventors: Christopher Dale Goldsmith, Littleton, CO (US); Richard Lamar Lord, Westminster, CO (US); Adam Brian Johnson, Thornton, CO (US); Ryan Caleb Wiebe, Arvada, CO (US)

(73) Assignee: INTEGRATED PACKAGING SOLUTIONS, LLC, Wheat Ridge, CO (US)

( * ) Notice: Subject to any disclaimer, the term of this patent is extended or adjusted under 35 U.S.C. 154(b) by 0 days.

(21) Appl. No.: 16/795,513

(22) Filed: Feb. 19, 2020

(51) Int. Cl.
  *G01B 11/26* (2006.01)
  *G01B 11/12* (2006.01)
(52) U.S. Cl.
  CPC .................................... *G01B 11/12* (2013.01)
(58) Field of Classification Search
  CPC ... G01B 11/00; G01B 11/024; G01B 11/2433; G01B 11/02; G01B 11/24; G01B 11/06

USPC ................. 356/601–636, 496, 138; 382/286; 250/559.12, 559.19
See application file for complete search history.

(56) References Cited

U.S. PATENT DOCUMENTS

| 7,933,006 B2 * | 4/2011 | Kumamoto | G01B 11/26 356/138 |
| 9,494,414 B2 | 11/2016 | Jaunarajs et al. | |
| 10,598,605 B2 * | 3/2020 | Velayutham | B30B 15/065 |
| 2010/0018374 A1 * | 1/2010 | Kumamoto | G01B 11/14 83/518 |

\* cited by examiner

*Primary Examiner* — Hoa Q Pham
(74) *Attorney, Agent, or Firm* — Optima Law Group, APC; Craig W. Barber; Thomas E. Jurgensen

(57) ABSTRACT

The present invention teaches a punch and die measurement device which includes a linear array LED micrometer arranged so that the light beams and shadows pass vertically from transmitters to receivers, and further teaches a 1:1 ratio pantograph for transferring measurements from inside of a necker die to outside the die where it may then be measured by the linear array LED micrometers. The invention may include a precision alignment block, captive adjustment screws to adjust tilt plates angle of the linear array measurement carriage and lever arms to reduce motion of the adjustment screws as applied to the tilt plates.

23 Claims, 25 Drawing Sheets

TOOL MEASURING DEVICE HAVING INDEPENDENT HEAD TILT AND ALIGNMENT AND HYBRID PANTOGRAPH-TO-OPTICAL INNER DIAMETER MEASUREMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but reserves all copyright rights whatsoever. 37 CFR 1.71(d).

FIELD OF THE INVENTION

This invention relates generally to devices for measuring tooling sets including dies and punches, and specifically to optical micrometer devices for measuring tooling, such as are found in class/subclass G01B 11/024.

STATEMENT REGARDING FEDERALLY FUNDED RESEARCH

This invention was not made under contract with an agency of the US Government, nor by any agency of the US Government.

BACKGROUND OF THE INVENTION

The traditional method of measuring industrial equipment such as punches and dies used mechanical calipers for measurement. This method eventually evolved from having operators manually adjusting calipers and squinting at vernier gauges to electrically actuated calipers with electronic readouts, but otherwise, mechanical caliper technology is little different than in times past. It remains relatively slow and in comparison to more modern methods can be prone to error, as well as not scaling well.

The more modern method may be seen by reference to FIGS. 2 and 3, which are abstracted from PRIOR ART U.S. Pat. No. 9,494,414. Linear arrays of optical scanners, in this case LED light beam transmitters paired with receivers which receive the light beams are used. The emitters are placed on one side of the tool to be scanned, the receivers on the other side, mounted on a movable carriage which has a central aperture. The tools to be measured (dies and punches) are placed on a fixture which passes through the aperture. As the carriage traverses the length of the tools, light is shined at the tool, which casts a shadow onto the linear receivers. The dividing line between light and shadow on the receivers then provides an accurate measurement of the dimensions of the tool.

However, it is obvious that the beams on both edges (terminators) of the tool must be exactly parallel. If one beam is even slightly out of parallel relative to the other beam, then the angular error created will propagate and increase as the shadow extends to the receivers. Even though the tool measurement device is carefully located on a solid work surface, with a vibration isolation plate and other precautions, the beams may over time slip out of alignment.

There is another issue with the prior art device.

For understanding, it is necessary to stop and re-examine the relative proportions of the die shown in FIG. 3: it is a shallow ring.

Unfortunately, not all dies are shallow rings. In particular, necker dies are a cylindrical body with a long interior, not shallow rings. Necker dies thus have a long, very smooth internal diameter surface. To measure this optically is conceptually simple: the LED micrometer beam can be shined up the length of the necker die, that is, co-axial with the die.

FIG. 14 shows this concept, and the problem that arises.

For reasons which are not entirely clear even on a theoretical basis, shining a light along a long highly polished internal surface results in what seems to be either defraction or scatter of the light beams, making the measurement difficult. As can be seen a reasonably coherent beam enters the necker die from below and strikes the polished internal surface, while a nearby beam passes just beside the surface. Conceptually a neat transition with a sharp cut-off of light should occur, but in reality, it does not. As can be seen, in reality the light beams become disorganized and the measurement inaccurate.

This long-standing problem in the industry has not been satisfactorily solved up until now, and so most necker die internal diameters could not be measured accurately by modern means. Producers of cylindrical bodies such as beverage cans have voiced a long-term need for an optical measuring device which could quickly and easily handle necker dies as well as normal dies and punches.

It would be preferable to provide a method of measuring tooling which is even more accurate than prior art optical measurement methods.

It would further be preferable to provide a method of measuring tooling which decreases, corrects or mitigates the effects of optical light beams departing from true parallel.

It would yet further be preferable to provide a method of measuring tooling which allows accurate optical measurement of internal diameters of highly polished cylindrical surfaces including necker dies.

SUMMARY OF THE INVENTION

General Summary

The present invention teaches a punch and die measurement device which includes a linear array LED micrometer arranged so that the light beams and shadows pass vertically from transmitters to receivers, which provides greater stability to the LED transmitters and receivers in an angular direction, so that normal vibration does not twist the transmitters and receivers out of alignment. Vertical alignment allows gravity based fixturing of the tools to remain centered between the beams at all times, so that a more compact and more accurate measuring device may be used. This prior art had to use larger beam widths to cover the range of tooling, simple due to the orientation being perpendicular to gravity.

In addition, the vertical orientation of the beams allows types of measurements not previously possible.

The invention may include captive adjustment screws to adjust tilt plates angle of the linear array measurement carriage. The captive adjustment screws push (and pull) lever arms, which lever arms increase the mechanical advantage of the screw motions so as to reduce motion of the tilt plates and thus allow very fine adjustment of the paired micrometer transmitters and receivers.

The angle of the vertical light beams on one side of the tool fixtures, and the vertical light beams on the other side of the tool fixtures, may be adjusted individually. This means that the degree of parallelism of the two light beams can be controlled and adjusted and angular errors can be corrected or mitigated.

A precision alignment block is also used in the present invention in conjunction with the individual angular adjustments of the light beams. This block has dimensions which are very precisely known, and thus serves as a calibration work piece: the block is placed into the device and the carriage and optical micrometers are passed across it. The light beams may then be assessed for their angular error and individually corrected in relation to one another and to true vertical.

The present invention further teaches a 1:1 ratio pantograph for transferring measurements from inside of a necker die to outside the die where it may then be measured by the linear array LED micrometers. The pantograph consists of two arms inside the necker die when the necker die is attached to a necker die fixture base, which arms are biased away from one another by weight (center of gravity) or springs or the like. Each arm is individually mechanically linked to an external pantograph arm outside of the necker die, and each arm is terminated by a measurement probe. Obviously the inside arms probes are for contact with the polished inner diameter of the necker die while the outer arms probes provide an identical measurement but which is external to the necker die AND also is a simple width measurement, representing an internal diameter measurement.

Thus the present invention teaches a hybrid technique in which the optical measurement of internal diameter consists of two steps: first a physical contact probe of the necker die ID, after which an LED micrometer optical scan of the pantograph non-contact probes provides a modern, accurate measurement.

Since the probes must be precise, they are designed to remain fixed while the necker die in the fixture can be raised and lowered by a height adjustment mechanism (and optionally a set of removable necker die bases which can be exchanged as needed on the necker die fixture). The height adjustment mechanism also provides precision elevation control by converting rotation of a wheel into modest vertical changes of the height of the necker die, simply using a pin trapped in a spiral groove on the wheel.

SUMMARY IN REFERENCE TO CLAIMS

It is therefore another aspect, advantage, objective and embodiment of the invention, in addition to those discussed previously, to provide a measuring device for measuring tools for making cylindrical bodies, such tools including dies and punches, the measuring device comprising:

a mounting surface having punch and die fixtures attached thereto, the die fixtures dimensioned and configured to allow attachment of such dies thereto and the punch fixtures dimensioned and configured to allow attachment of such punches thereto;

a plurality of LED micrometer transmitters oriented so as to emit vertical light beams, the vertical light beams partially striking at least one such tool, such one tool casting at least one vertical shadow;

a plurality of LED micrometer receivers oriented so as to measure the vertical light beams.

It is therefore another aspect, advantage, objective and embodiment of the invention, in addition to those discussed previously, to provide a measuring device for measuring tools for making cylindrical bodies, such tools including dies and punches, further comprising:

a carriage frame having a central opening, the central opening having a top and a bottom, a first one of the LED micrometer transmitters mounted by means of a first tilt plate to the carriage frame at one of the central opening top and central opening bottom and a first one of the LED micrometer receivers mounted by means of the first tilt plate to the carriage frame diametrically opposed to the first LED micrometer transmitters, a second one of the LED micrometer transmitters mounted by means of a second tilt plate to the carriage frame at one of the central opening top and central opening bottom and a second one of the LED micrometer receivers mounted by means of the second tilt plate to the carriage frame diametrically opposed to the second LED micrometer transmitters;

the carriage frame movable and mounted so that the carriage frame central opening passes about the punch and die fixtures during motion, whereby:

the carriage frame central opening passes about such at least one tool during motion.

It is therefore another aspect, advantage, objective and embodiment of the invention, in addition to those discussed previously, to provide a measuring device for measuring tools for making cylindrical bodies, such tools including dies and punches, wherein the mounting surface further comprises:

a vibration isolation plate.

It is therefore another aspect, advantage, objective and embodiment of the invention, in addition to those discussed previously, to provide a measuring device for measuring tools for making cylindrical bodies, such tools including dies and punches, further comprising:

a first central pin about which the first tilt plate may pivot;

a second central pin about which the second tilt plate may pivot.

It is therefore another aspect, advantage, objective and embodiment of the invention, in addition to those discussed previously, to provide a measuring device for measuring tools for making cylindrical bodies, such tools including dies and punches, further comprising:

a first lever attached to the first tilt plate at a first end of the first lever, whereby when the first lever moves the first tilt plate moves;

a second lever attached to the second tilt plate at a first end of the second lever, whereby when the second lever moves the second tilt plate moves.

It is therefore another aspect, advantage, objective and embodiment of the invention, in addition to those discussed previously, to provide a measuring device for measuring tools for making cylindrical bodies, such tools including dies and punches, further comprising:

a first captive screw passing through a first threaded aperture in a first arm of the first lever, rotation of the first captive screw causing motion of the first arm of the first lever, which motion is mechanically reduced by the first lever to cause corresponding but reduced motion of the first tilt plate;

a second captive screw passing through a first threaded aperture in a first arm of the second lever, rotation of the second captive screw causing motion of the first arm of the second lever, which motion is mechanically reduced by the second lever to cause corresponding but reduced motion of the second tilt plate.

It is therefore another aspect, advantage, objective and embodiment of the invention, in addition to those discussed previously, to provide a measuring device for measuring tools for making cylindrical bodies, such tools including dies and punches, wherein the carriage frame is further mounted upon a linear drive rail or leadscrew.

It is therefore another aspect, advantage, objective and embodiment of the invention, in addition to those discussed previously, to provide a measuring device for measuring tools for making cylindrical bodies, such tools including dies and punches, wherein the carriage frame is actuated into motion by an actuator such as a servo, stepper, motor, or the like.

It is therefore another aspect, advantage, objective and embodiment of the invention, in addition to those discussed previously, to provide a measuring device for measuring tools for making cylindrical bodies, such tools including dies and punches, further comprising:

a precision alignment block removably mounted upon the mounting surface at a first place at which the carriage frame central opening may pass about it, the precision alignment block having two sides, the two sides being parallel, whereby a precision alignment block shadow is cast.

It is therefore another aspect, advantage, objective and embodiment of the invention, in addition to those discussed previously, to provide a measuring device for measuring tools for making cylindrical bodies, such tools including dies and punches, wherein the precision alignment block further comprises:

a precisely known width dimension, which precisely known width dimension in turn has a maximum error;

whereby the two tilt plates may be individually adjusted until the vertical beams cast by the LED micrometer transmitters on each plate are parallel to the respective parallel sides of the precision alignment block;

in turn whereby a maximum beam variation is established based upon the maximum error of the width dimension of the precision alignment block.

It is therefore another aspect, advantage, objective and embodiment of the invention, in addition to those discussed previously, to provide a measuring device for measuring tools for making cylindrical bodies, such tools including dies and punches, wherein the maximum beam variation is 0.000020 inches over 1 vertical inch.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, the measuring device comprising:

a mounting surface having a necker die fixture attached thereto, the necker die fixture having a base dimensioned and configured to allow attachment of such necker dies thereto with such axis oriented vertically, the necker die fixture comprising a pantograph;

a plurality of LED micrometer transmitters oriented so as to emit vertical light beams, the vertical light beams striking a first end of the necker die fixture, the necker die fixture pantograph casting at least one vertical shadow;

a plurality of LED micrometer receivers oriented so as to measure the vertical light beams.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, further comprising:

a first plurality of pantograph arms positioned at the base and dimensioned and configured to project into such necker die interior when such necker die is attached to the base;

a second plurality of pantograph arms projecting from the first end of the necker die fixture into the vertical light beams;

the first and second plurality of pantograph arms mechanically linked so that they maintain an identical angular orientation.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, further comprising:

a contact probe terminating each pantograph arm.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, wherein the contact probes further comprise: spheres.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, wherein the base further comprises:

a vertical adjustment mechanism having a height selector wheel, the height selector wheel having a spiral lifting slot therein, the spiral lifting slot having a captive lifting pin there, the captive lifting pin being attached to the base; whereby, when the height selector wheel is turned, the captive lifting pin changes a height of the base.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, wherein the pantograph arms further comprise:

means for urging the pantograph arms apart.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, wherein the means for urging the pantograph arms apart comprise: at least one spring.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, wherein the means for urging the pantograph arms apart comprise: a center of gravity external to the arms.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, further comprising:

at least one handle disposed outside the necker die fixture, the at least one arm mechanically linked to and operative to move at least one of the pantograph arms.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, wherein the first plurality of pantograph arms have a first probe separation distance and the second plurality of pantograph arms have a second probe separation distance, and the first and second probe separation distances have a measured distance ratio.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, wherein the measured distance ratio is 1:1.

It is therefore another aspect, advantage, objective and embodiment of the invention, in addition to those discussed previously, to provide a measuring device for measuring tools for making cylindrical bodies, such tools including cylindrical necker dies having an axis and an interior, such interior having a diameter, such tools also including dies and punches, the measuring device comprising:

a mounting surface having punch and die fixtures attached thereto, the die fixtures dimensioned and configured to allow attachment of such dies thereto and the punch fixtures dimensioned and configured to allow attachment of such punches thereto;

the mounting surface having a necker fixture attached thereto, the necker die fixture having a base dimensioned and configured to allow attachment of such necker dies thereto with such axis oriented vertically, the necker die fixture comprising a pantograph;

a plurality of LED micrometer transmitters oriented so as to emit vertical light beams and a plurality of LED micrometer receivers oriented so as to measure the vertical light beams;

a carriage frame having a central opening, the central opening having a top and a bottom, a first one of the LED micrometer transmitters mounted by means of a first tilt plate to the carriage frame at one of the central opening top and central opening bottom and a first one of the LED micrometer receivers mounted by means of the first tilt plate to the carriage frame diametrically opposed to the first LED micrometer transmitters, a second one of the LED micrometer transmitters mounted by means of a second tilt plate to the carriage frame at one of the central opening top and central opening bottom and a second one of the LED micrometer receivers mounted by means of the second tilt plate to the carriage frame diametrically opposed to the second LED micrometer transmitters;

the carriage frame movable and mounted so that the carriage frame central opening passes about the punch fixture and die fixture and a first end of the necker die fixture during motion, when the carriage frame is in a first position the vertical light beams striking a first end of the necker die fixture, the necker die fixture pantograph casting at least one vertical shadow;

when the carriage frame is in a second position the vertical light beams partially striking at least one such tool, such one tool casting at least one vertical shadow;

a first central pin about which the first tilt plate may pivot and a second central pin about which the second tilt plate may pivot;

a first lever attached to the first tilt plate at a first end of the first lever, whereby when the first lever moves the first tilt plate moves;

a second lever attached to the second tilt plate at a first end of the second lever, whereby when the second lever moves the second tilt plate moves;

a first captive screw passing through a first threaded aperture in a first arm of the first lever, rotation of the first captive screw causing motion of the first arm of the first lever, which motion is mechanically reduced by the first lever to cause corresponding but reduced motion of the first tilt plate;

a second captive screw passing through a first threaded aperture in a first arm of the second lever, rotation of the second captive screw causing motion of the first arm of the second lever, which motion is mechanically reduced by the second lever to cause corresponding but reduced motion of the second tilt plate;

a precision alignment block removably mounted upon the mounting surface at a first place at which the carriage frame central opening may pass about it whereby a precision alignment block shadow is cast, the precision alignment block having two sides, the two sides being parallel, the precision alignment block having a precisely known width dimension, which precisely known width dimension in turn has a maximum error, whereby the two tilt plates may be individually adjusted by rotating the first and second captive screws until the vertical beams cast by the LED micrometer transmitters on each plate are parallel to the respective parallel sides of the precision alignment block;

a maximum beam variation established based upon the maximum error of the width dimension of the precision alignment block;

a first plurality of pantograph arms positioned at the base and dimensioned and configured to project into such necker die interior when such necker die is attached to the base;

a second plurality of pantograph arms projecting from the first end of the necker die fixture into the vertical light beams when the carriage frame is in the first position;

a contact probe terminating each pantograph arm;

the first and second plurality of pantograph arms mechanically linked so that they maintain an identical angular orientation, the first and second plurality of pantograph arms having means for urging the first plurality of pantograph arms apart;

the first plurality of pantograph arms have a first probe separation distance and the second plurality of pantograph arms have a second probe separation distance, and the first and second probe separation distances have a measured distance ratio.

BRIEF DESCRIPTION OF THE DRAWINGS

FIG. 9 is a top view of the LED micrometer measurement carriage of the present invention, showing the captive adjustment screws end on.

FIG. 17, shows further details of the height adjustment wheel, frame, etc.

INDEX TO REFERENCE NUMERALS

Figure 2:
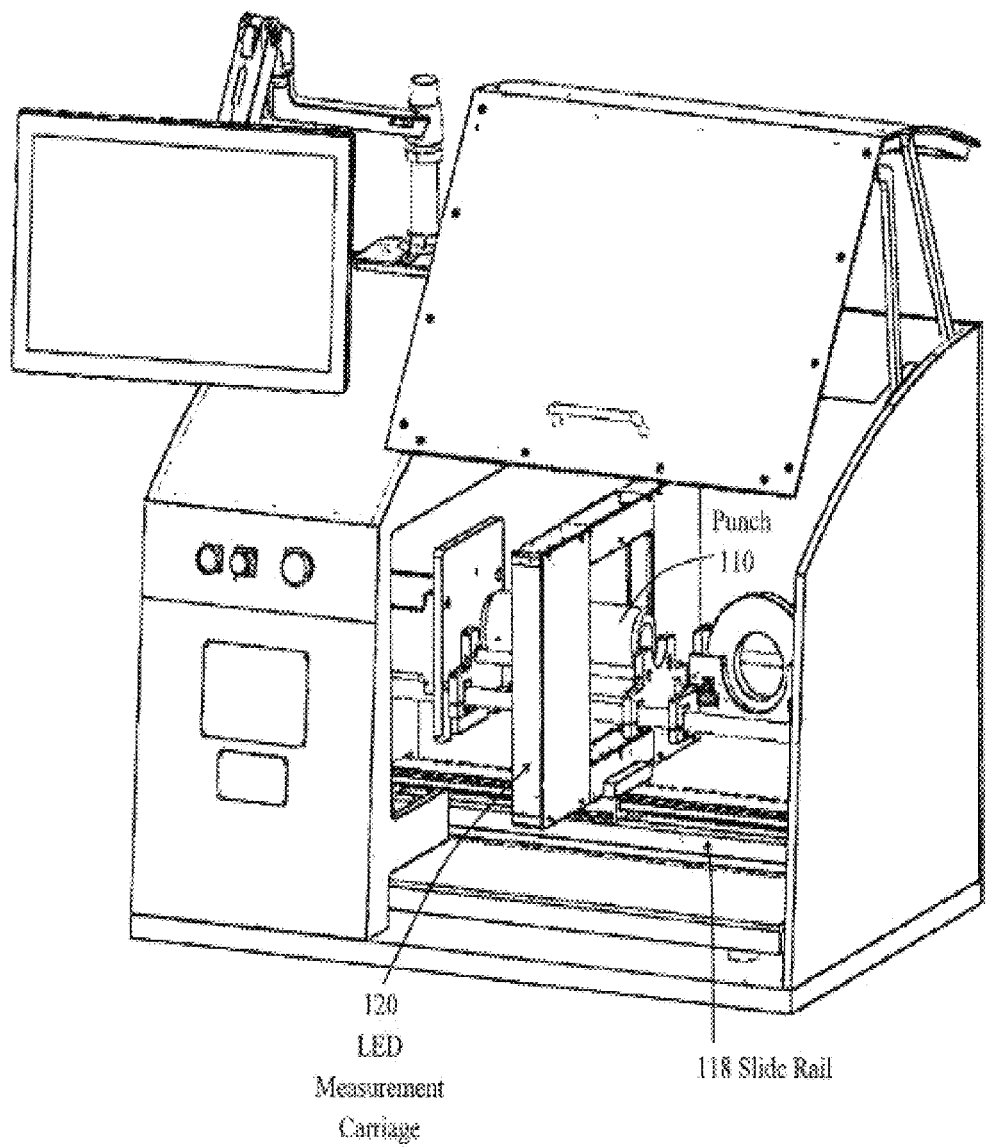
FIG. 2 is a PRIOR ART elevated orthogonal view of a PRIOR ART tool measuring device incorporating LEDs for measurement but arranged with horizontal beam and shadow projection.
Figure 3:
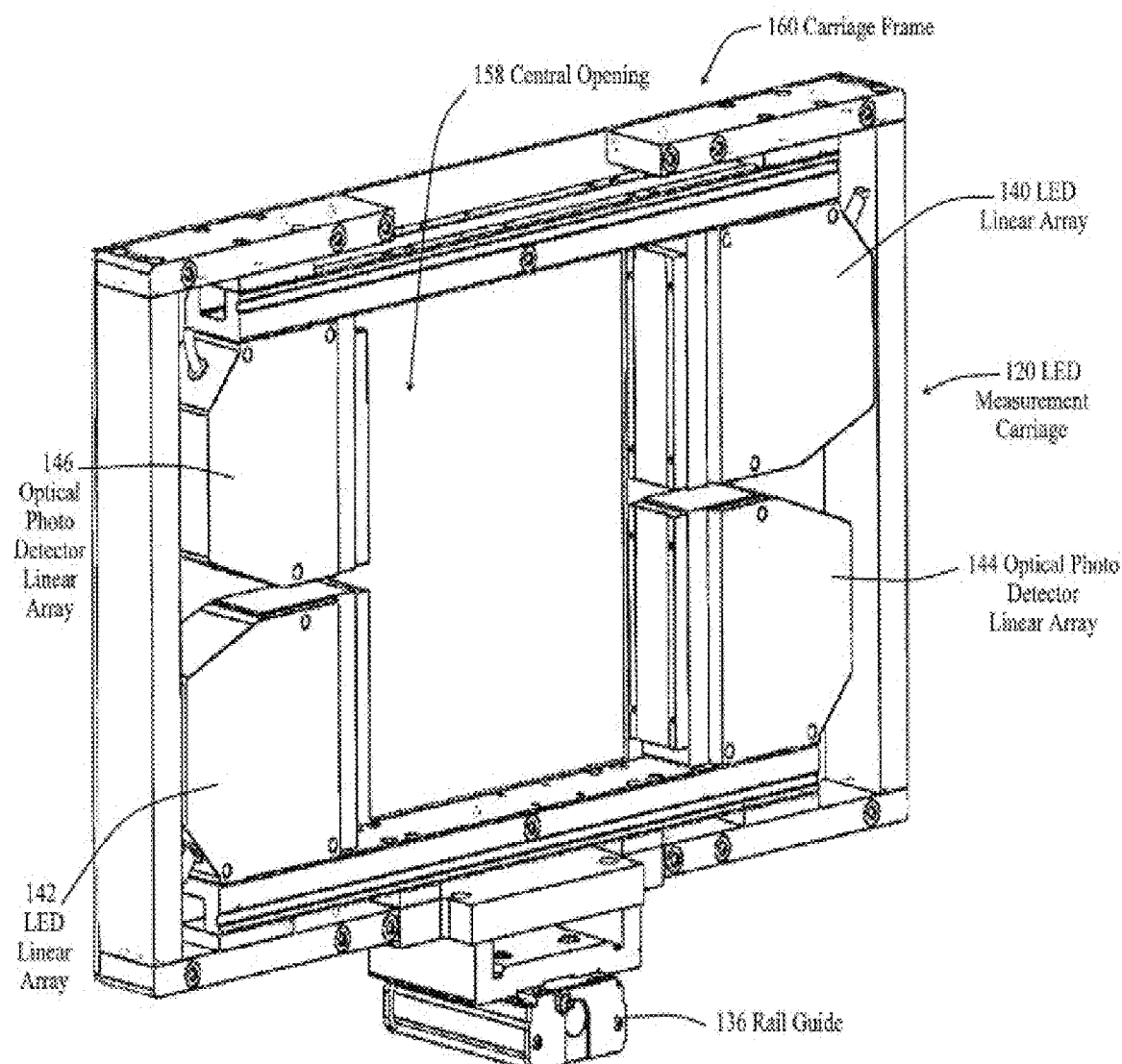
FIG. 3 is a PRIOR ART elevated orthogonal view of a PRIOR ART LED measurement carriage, showing the arrangement of the linear LED arrays is vertical, producing horizontal beams.

Reference numerals of FIGS. 2 & 3 are carried over from another patent and are not used in the present patent application.

FIGS. 1 & 4 through 11 & FIG. 24:
Die 102
Punch 104
Mounting surface/vibration isolation plate 106
Punch fixture 108
Die fixture 110
LED micrometer transmitter 112
LED micrometer receiver 114
Vertical light beams 116
Carriage frame 118
Central opening 120
Opening top 122
Opening bottom 124
Leadscrew aperture 125
First tilt plate 126
Second tilt plate 128
First central pin 130
Second central pin 132
First lever 134
Second lever 136
Second lever first end 140
First captive screw 142
First threaded aperture of first lever 144
First lever first arm 146
Second captive screw 148
First threaded aperture of second lever 150
Second lever first arm 152
Leadscrew 154
Precision alignment block 158
First location 160
Block width 162
Block width error 164
Maximum beam variation 166
FIGS. 12 through 23:
Measuring device 200
Necker die 202
Necker die axis 204
Necker die interior 206
Necker die interior diameter 208
Necker die fixture 210
Base 212
Pantograph 214
LED micrometer transmitters 216
LED micrometer receivers 218
Inner pantograph arms 220
Outer pantograph arms 222
Mechanical link from inner to outer arm 224
Angular orientation 226
Contact probe 228
Non-contact probe 229
Height adjustment wheel 230
Spiral lifting slot 232
Captive lifting pin 234
Manual levers 235
Weights 236
Springs 238
C.G. 240
Probe separation distance 242
Light beams scattered 244
Light beam measuring non-contact probe 246

DETAILED DESCRIPTION

Glossary

A punch, die and necker die are can making tools and nothing in this specification is to be taken to alter their normal definitions in the can making industry. These items are mentioned below in preambular language but are not claimed as parts of the device of the invention.

A pantograph is any device for replicating exactly a motion, position or dimensional measurement from a first location to a second location. While most pantographs are used either to create scaled versions of an original (for example, larger drawings from smaller drawings) or to extend a support arm, the present pantograph is used to translate a measurement from inside of a necker die to outside of a necker die, where it may be more accurately measured by optical means. The present pantograph may provide a 1:1 measurement without scaling. Alternatively, it may also scale up or down the original measurement to scaling factor which is precisely known from the physical dimensions of the pantograph itself, however, this would then require later compensation for the scaling, so those are not the presently preferred embodiments nor best modes presently contemplated.

A necker die is used to "neck" a cylindrical body such as an aluminum beverage can. A work piece is inserted into the necker die to reduce the diameter of the work piece.

In the present invention, it will be understood that the work pieces are the tools used to create can bodies, not the cans. Thus the measuring device accurately measures dies, necker dies, punches and similar tooling.

End Glossary

Figure 1:
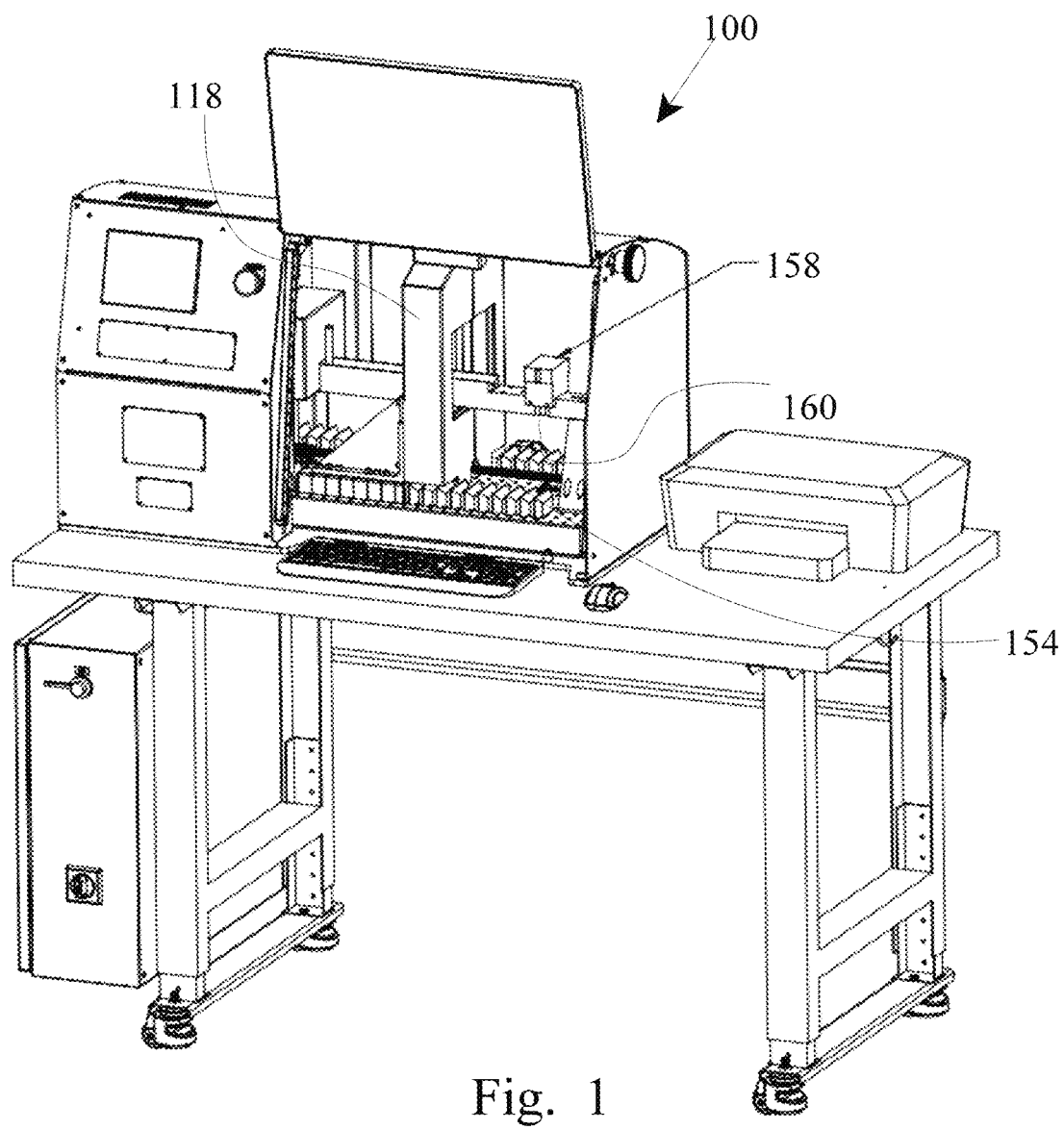
FIG. 1 is an elevated orthogonal view of a first embodiment of the invention, a tool measuring apparatus incorporating a LED head tilt and adjustment mechanism with a preciesion alignment block. In particular, it may be see that the dimension used in measurement has been rotated 90 degrees compared to the next drawing.

FIG. 1 is an elevated orthogonal view of a first embodiment of the invention, a tool measuring apparatus 100 incorporating a LED head tilt and adjustment mechanism with a precision alignment block. In particular, it may be see that the dimension used in measurement has been rotated 90 degrees compared to the next drawing.

The movable measurement carriage frame 118 has within it two LED optical micrometers (each micrometer is an LED transmitter shining light into an opposed receiver). The carriage frame 118 rides upon 154.

At location 160, precision alignment block 158 has been positioned. The vertical light beams of the invention may be shown upward past the block, and since the exact dimensions of the block are known, the light beams may be calibrated using the block.

FIG. 2 is a PRIOR ART elevated orthogonal view of a PRIOR ART tool measuring device incorporating LEDs for measurement but arranged with horizontal beam and shadow projection.

A punch and die may be seen upon the fixtures, while the measurement carriage is traversing them to make a measurement. The measurement carriage of the PRIOR ART is arranged so that the LED light transmitters shine sideways across the punch and die.

FIG. 3 is a PRIOR ART elevated orthogonal view of a PRIOR ART LED measurement carriage, showing the arrangement of the linear LED arrays is vertical, producing horizontal beams. The linear array of LEDs on one side can be seen to face opposing optical photo detectors on the others side, with a central aperture for the tools to be measured.

However, in practice, the arrangement had certain limitations, for example the optical micrometers once in a while tended to get out of alignment even though they were mounted upon a single plate together.

Importantly, the adjustment was very difficult. Adjustment of the micrometers could only be made by using shims, and so the precision was automatically limited to the thinnest practical shim. This was not just time consuming, it was inaccurate. It was found to be very sensitive to thermal effects, which then created misalignment due to its size.

Figure 4:
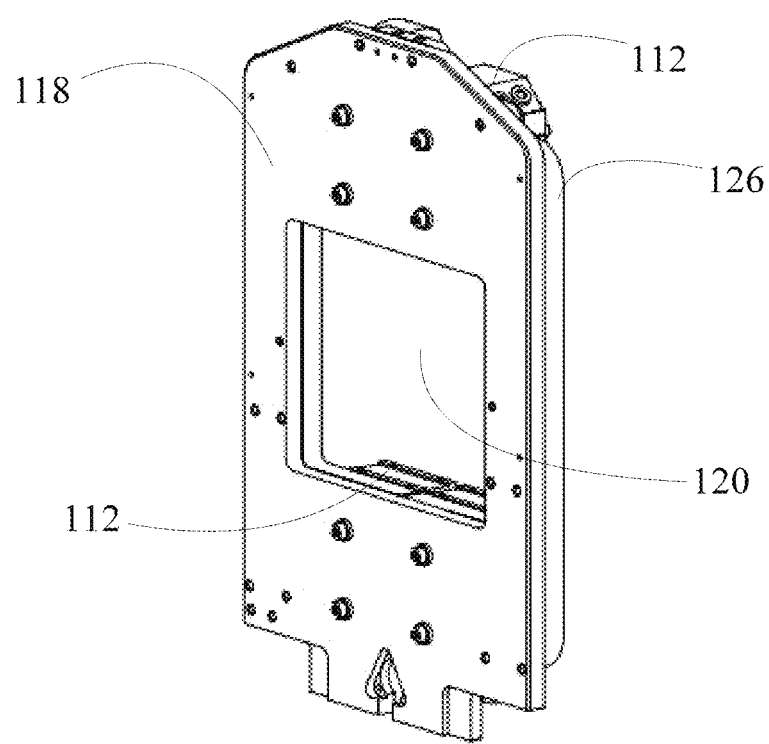
FIG. 4 is an elevated orthogonal view of an LED measurement carriage of the present invention.

FIG. 4 is an elevated orthogonal view of an LED measurement carriage 118 of the present invention. Central aperture 120 has top and bottom edges and it may be seen that the LED light transmitters 112 are mounted on the top and bottom edges, not on the sides. This obviously means that light beams will be vertical, not horizontal. This change is extremely beneficial for reasons which will be explained further.

Another important item is first tilt plate 126, seen edge on and largely occluded in this figure but much clearer in the next drawing.

Figure 5:
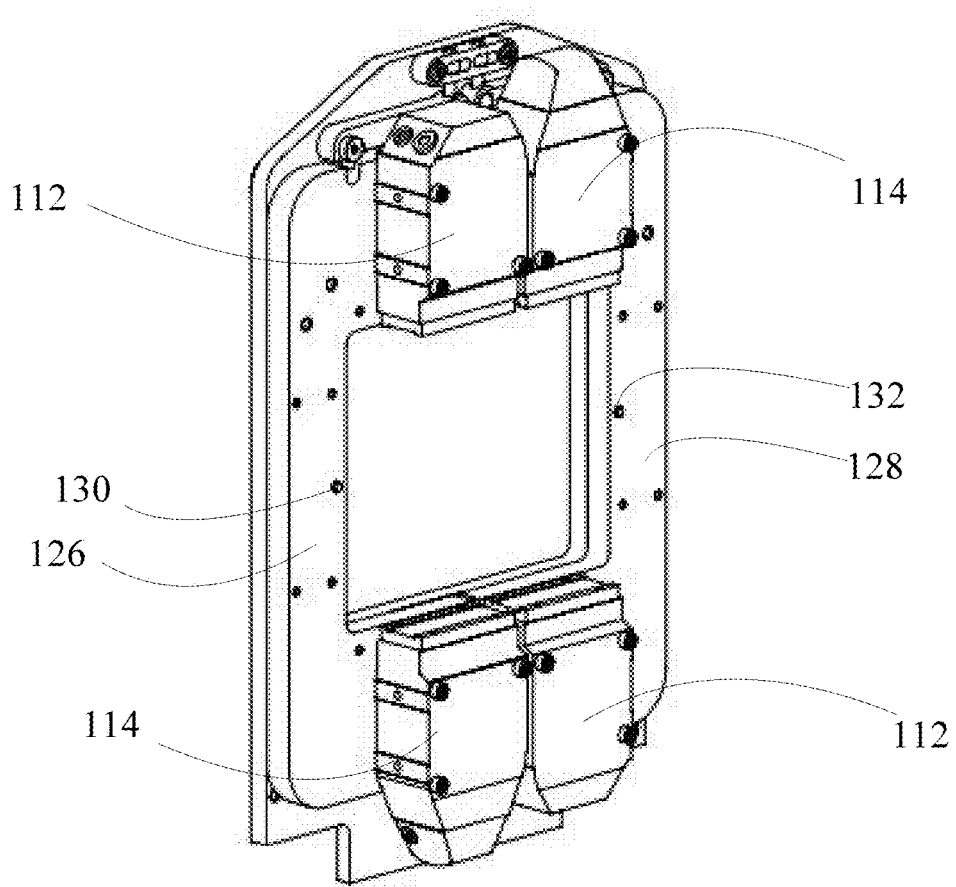
FIG. 5 is an elevated orthogonal view of an LED micrometer measurement carriage of the present invention, showing the arrangement of the LED micrometer transmitters and receivers in a horizontal alignment producing a pair of vertical beams.

FIG. 5 is an elevated orthogonal view of an LED micrometer measurement carriage 118 of the present invention, showing the arrangement of the LED micrometer transmitters 112 and receivers 114 in an arrangement producing a pair of vertical beams.

Each transmitter/receiver pair is vertical and each pair is mounted on a single tilt plate. The left transmitter and the corresponding left receiver (as viewed) are mounted on the left tilt plate 126, while the right transmitter and the opposing right receiver are mounted on the right tilt plate 128.

This mounting arrangement frees up the pairs of light beam micrometers to be adjusted separately, and thus adjusted relative to one another. For example, should the pair on the left fall out of alignment, even by a seemingly small amount (0.001 inch would be a large variation), the pair on the left can be adjusted relative to the pair on the right by adjusting tilt plate 126 but not adjusting tilt plate 128.

The tilt plates are mounted upon central pivot pins 130 for the tilt plate 126 and pin 132 for tilt plate 128. These pins are the point about which the tilt plates 126/128 are adjusted. The mechanism used for adjustment may be seen at the top of the carriage frame 118 and will be discussed further in regard to the following diagrams.

Figure 25:
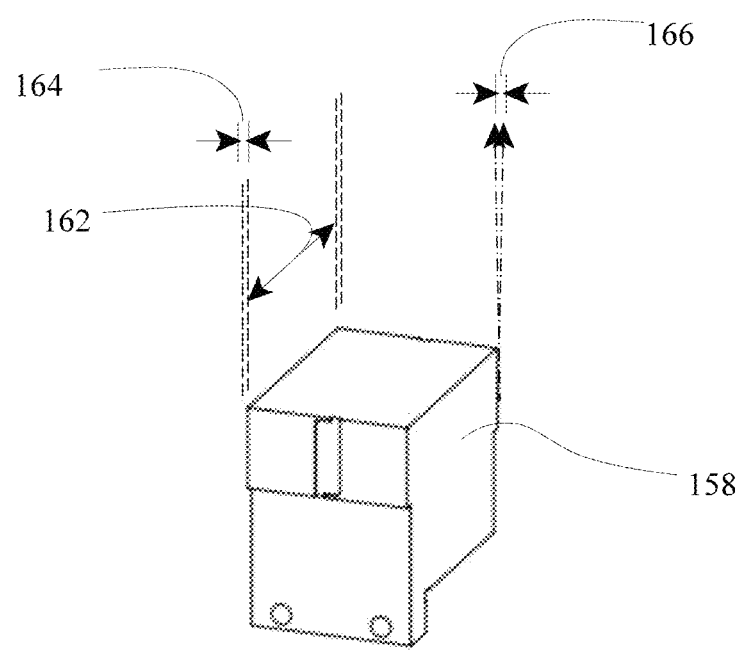
FIG. 25 is an elevated orthogonal view of a precision alignment block according to the present invention.

FIG. 25 is an elevated orthogonal view of the precision alignment block 158 used in order to carry out the alignment of the tilt plates.

The block 158 has mounting equipment to allow it to fasten to the measuring device or a fixture thereof. The block 58 also has a width, 162. The width has a maximum error which is as small as practical, in the present best mode and preferred embodiment the maximum error of the block is only 0.00002 inch.

This in turn means that when light beams pass across the faces of the block, a maximum variation 166 (of the light beams from true) is known. By using the block to calibrate the measuring device 100 of the invention, an extremely small error may be achieved, for example 0.00002 inches over 1 vertical inch. The calibration is of course carried out by adjusting one or both tilt plates as previously described in regard to FIG. 5 and later in regard to FIGS. 7 through 11.

Figure 6:
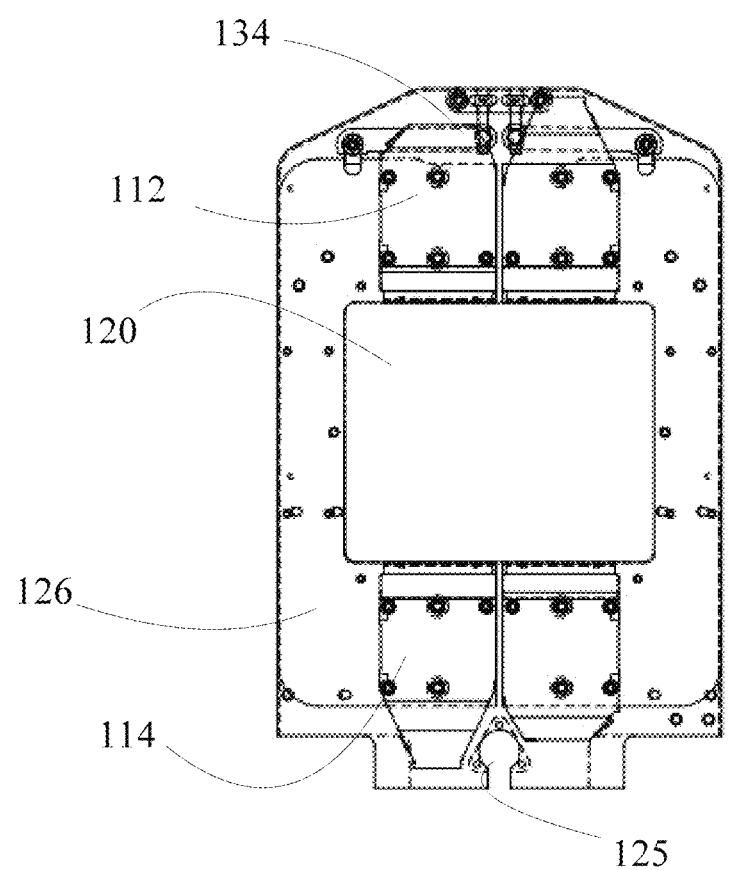
FIG. 6 is a front view with hidden lines showing the LED micrometer measurement carriage of the present invention.

FIG. 6 is a front view with hidden lines showing the LED micrometer measurement carriage 118 of the present invention. In addition, the leadscrew aperture 125 may be seen at the bottom of the carriage frame 118. This leadscrew aperture is dimensioned and configured to mechanically engage to the (linear drive rail or) leadscrew 154 and allow the carriage frame 118 to move.

Lever 134 may be partially seen and partially seen in hidden lines. This mechanism, (displayed more clearly in FIGS. 7 and 8) is used to perform the individual adjustment of the tilt plates 126 and 128.

Figure 7:
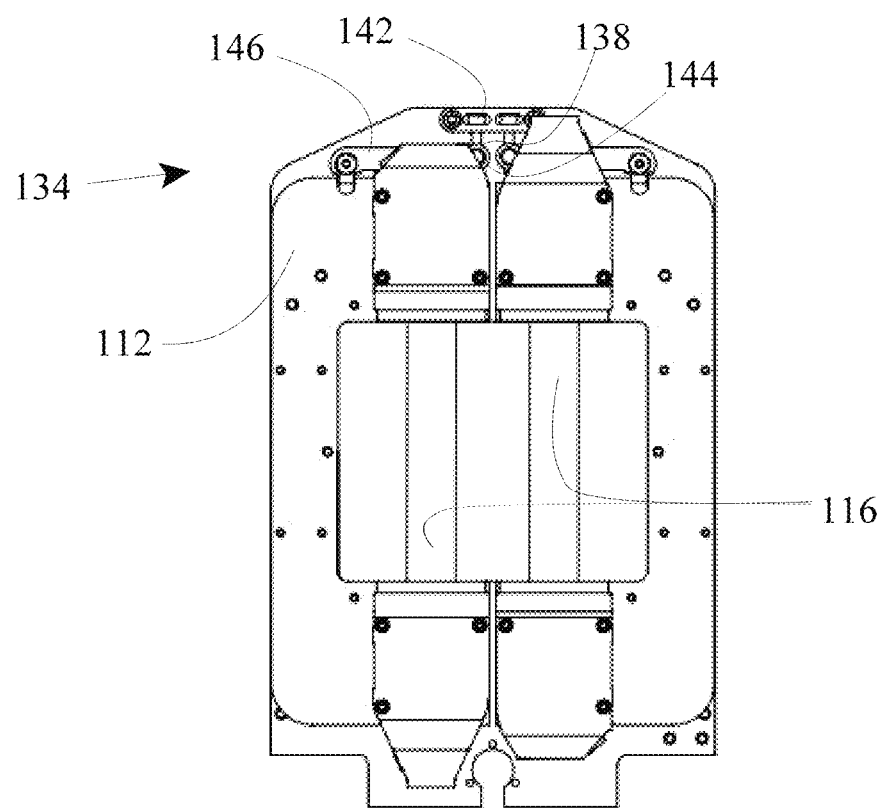
FIG. 7 is a front view with hidden lines which further shows the optical beams passing through the aperture of the LED micrometer measurement carriage.

FIG. 7 is a front view with hidden lines which further shows the optical beams passing vertically across the central aperture 120 of the LED micrometer measurement carriage 118. The light beams are separated by a gap in this embodiment but do not need to be, this is merely an aspect of the LED micrometer design.

It is worth mentioning in passing that the LED transmitters and receivers in this embodiment are mounted to that the beam on the left is shining downward while the beam on the right is shining upward. This is an option and not required. The transmitter on the left upper side is shining down to the receiver on the left (note that the back end of the receiver is somewhat longer than the back end of a transmitter). The transmitter on the bottom right is shining upward to the receiver on the top right. It may appear that the two units on the top are linked but actually they are separate, mounted on different tilt plates, and corresponding respectively to the opposing units on the bottom, not to the unit beside them on the top of the aperture. The same applies to the two units (again, a transmitter and receiver) on the bottom edge of the aperture.

Despite the top two units partial occlusion, details of the adjustment levers 134 may be made out. A screwhead 142 engages a first end 138 of lever 134: the screw threads pass through threaded aperture 144. This motion, already reduced by the threading, is further reduced by the mechanical disadvantage of moving long arm 146. The result is that the motions of the tilt plate 126 are quite delicate and fine adjustments can be made easily.

Figure 8:
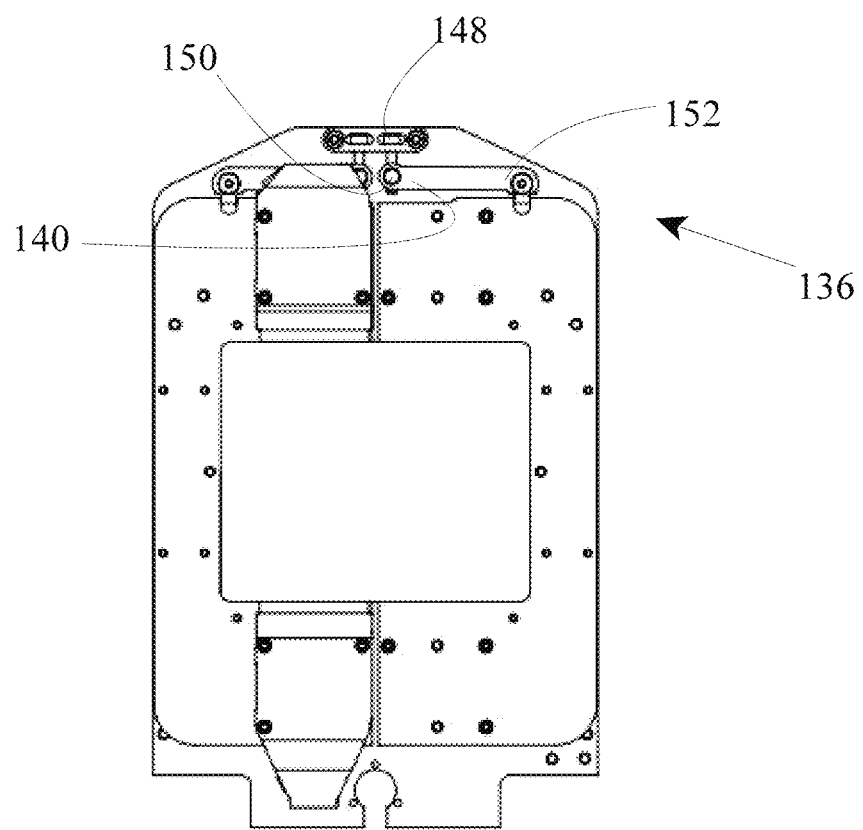
FIG. 8 is a front view with partial hidden lines showing the LED micrometer measurement carriage of the present invention, however with the left micrometer transmitter and receiver shown and the right micrometer transmitter and receiver hidden, the front view unimpeded on the right half.

FIG. 8 is a front view with partial hidden lines showing the LED micrometer measurement carriage 118 of the present invention, however with the left micrometer transmitter and receiver shown and the right micrometer transmitter and receiver hidden, the front view unimpeded on the right half.

Second captive screwhead 148 controlling second lever 136 and associated parts may now be seen clearly. First threaded aperture 150 of the second arm 136 may be seen to alter the position of first arm 152 of second lever 136, allowing these careful adjustments. Since there are two sets of arms (134 and 136) controlling two tilt plates (126 and 128), the two pairs of transmitters and receivers are controlled independently.

For example, the left transmitter is shown in FIG. 8 shining down to the left receiver. If the SECOND lever 136 (visible in FIG. 8) is adjusted, it will adjust only the right tilt plate but NOT change the position of the left tilt plate and not the position of the transmitter and receiver shown.

Figure 9:
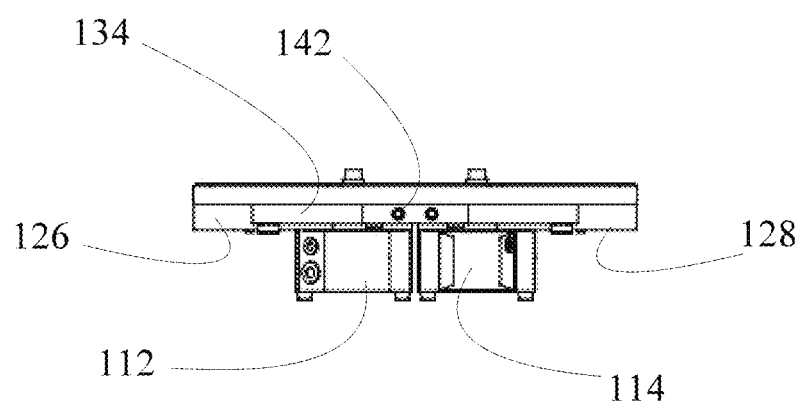

FIG. 9 is a top view of the LED micrometer measurement carriage of the present invention, showing the captive adjustment screws 142/148 end on. Lever 134 controls tilt plate 126 only, and thus adjusts the position of transmitter 112 only, without altering the position of the receiver 114, which is not used in conjunction with transmitter 112 in any case, being paired to the lower transmitter on tilt plate 128, which is not visible in this diagram.

Figure 10:
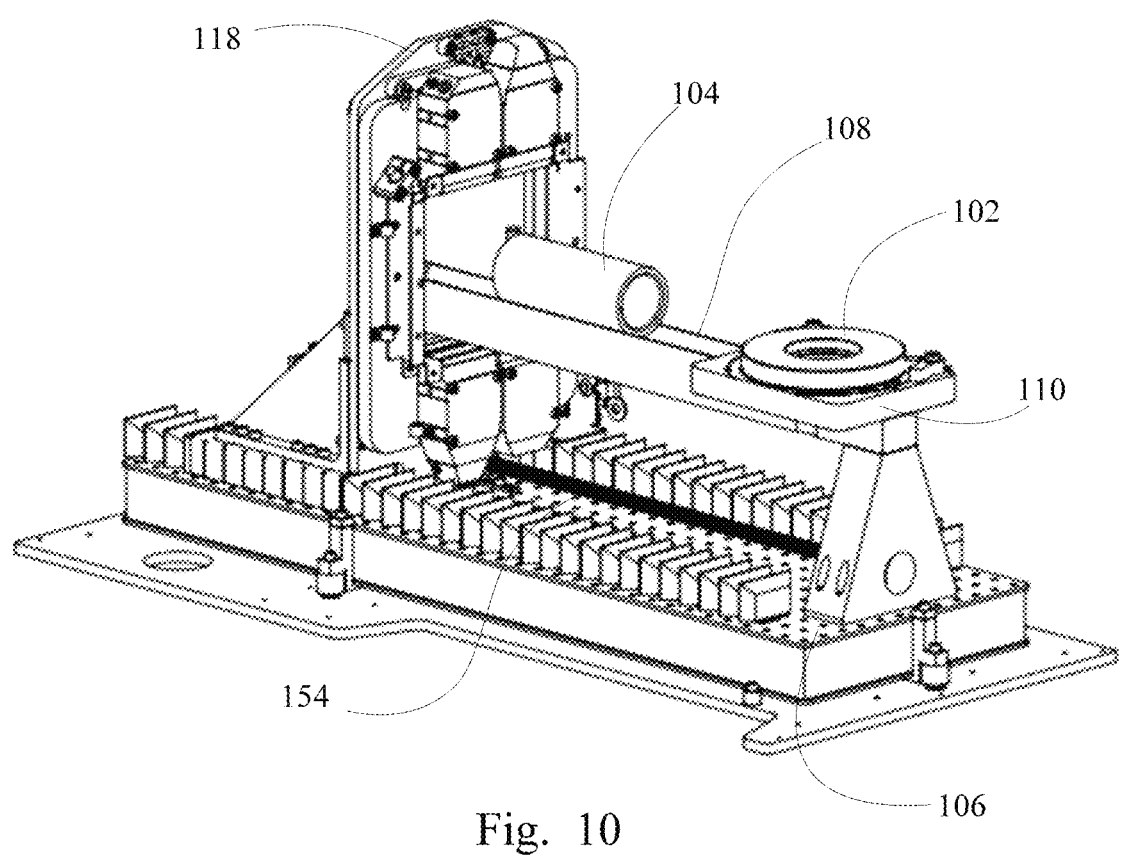
FIG. 10 is an elevated orthogonal view of the mounting plate of the invention with vibration isolation, a punch and die mounted upon punch and die fixtures and the carriage frame of the invention showing the LED micrometers.

FIG. 10 is an elevated orthogonal view of the mounting plate of the invention with vibration isolation, a punch and die mounted upon punch and die fixtures and the carriage frame of the invention showing the LED micrometers.

Figure 11:
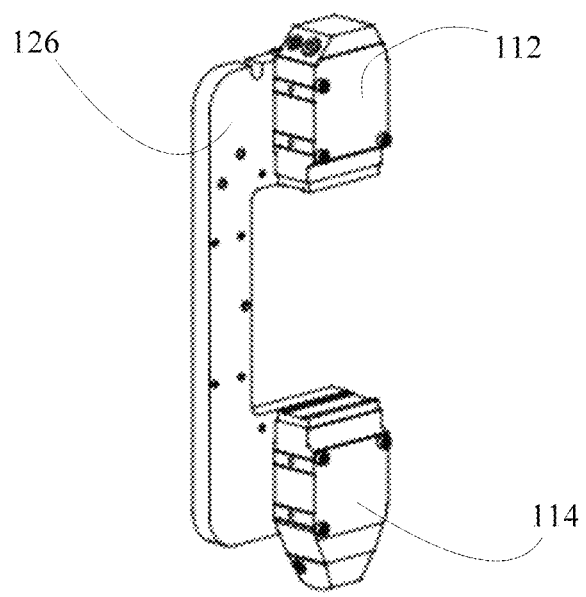
FIG. 11 is a view of a single tilt plate showing a single LED micrometer, the emitter on the top of the plate facing down and the receiver on the bottom of the plate facing upward to read light beams from the emitter.

FIG. 11 is a view of a single tilt plate showing a single LED micrometer, the emitter on the top of the plate facing down and the receiver on the bottom of the plate facing upward to read light beams from the emitter.

Figure 14:
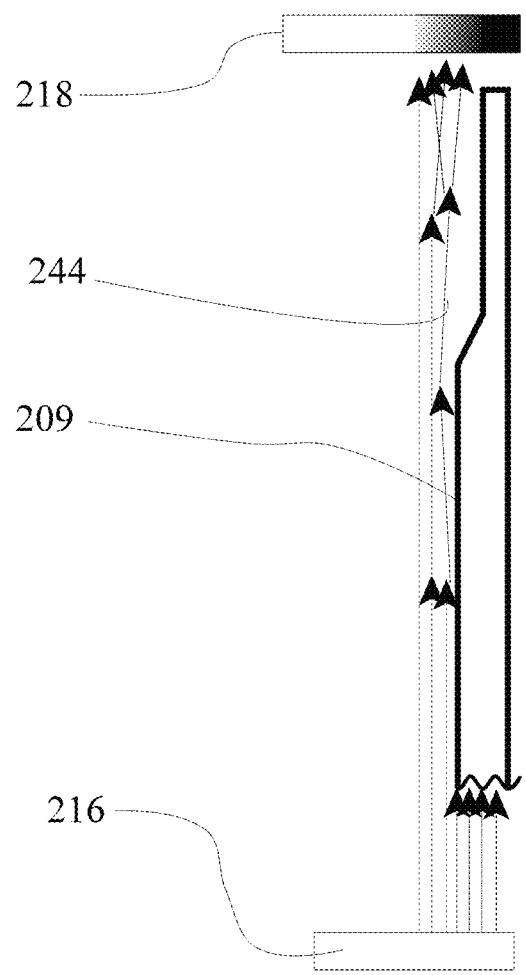
FIG. 14 is a conceptual view of a PRIOR ART light source measurement of an internal diameter, showing error in shadow casting techniques in attempting precision internal measurements.

FIG. 14 is a conceptual view of a PRIOR ART light source measurement of an internal diameter, showing error in shadow casting techniques in attempting precision internal measurements. LED emitters 216 are shining numerous light beams (arrows) up the inside of surface 209 to LED receivers 218. In principle this should be direct and result in an accurate measurement. However, as noted previously what actually transpires is that light beams 244 become somehow disorganized. While the physics is not entirely clear, the results are. Light receivers 218 should, and would normally be expected to, produce a nice sharp dividing line between shadow and light beams and thus provide a very exact measurement. Unfortunately in practice this is not true. The disorganized light beams 244 produce an irregular transition from light to shadow and measurement is degraded.

The present invention allows precise measurement of an internal surface, regardless of polish, by optical micrometry preceded by contact and pantograph.

Figure 12:
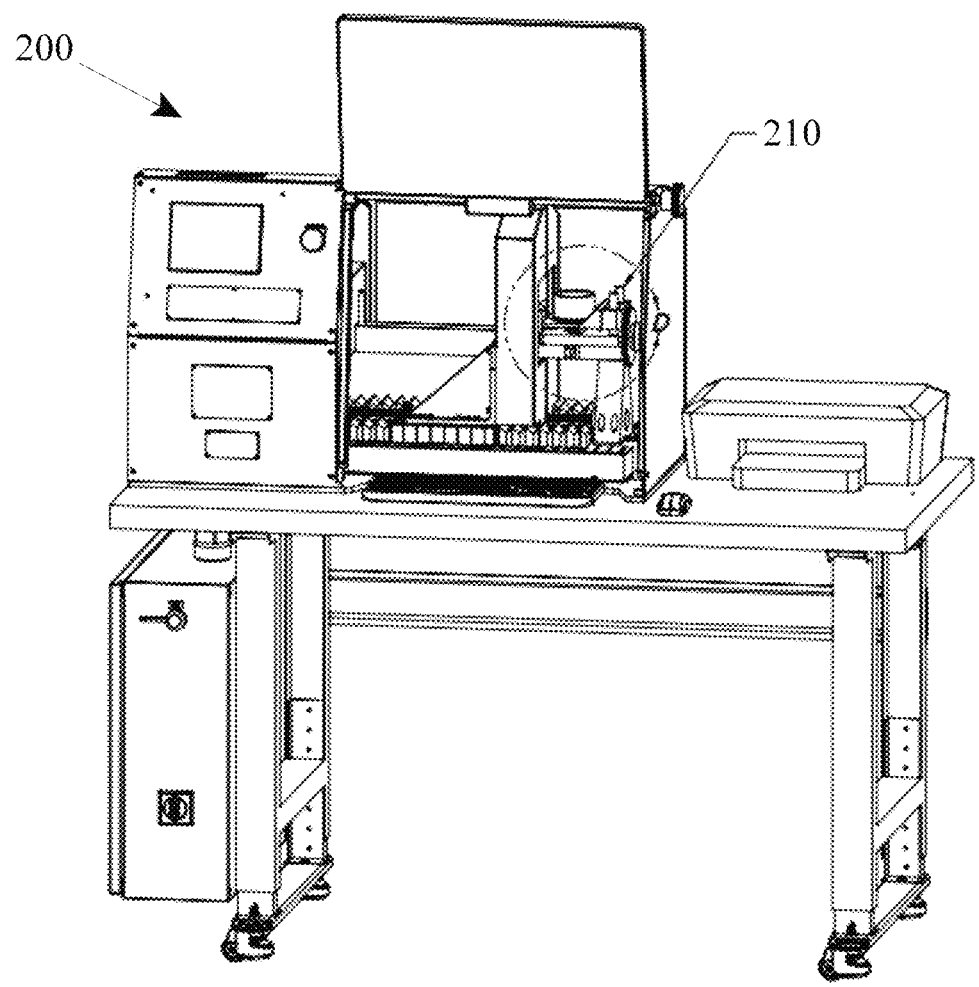
FIG. 12 is an elevated orthogonal view of a different embodiment of the invention, a tool measuring apparatus incorporating a necker die fixture allowing precision internal measurements without any of the previously mentioned diffraction errors.

FIG. 12 is an elevated orthogonal view of a different embodiment of the invention, a tool measuring apparatus 200 incorporating a necker die fixture 210 allowing precision internal measurements without any of the light beam errors which occur when light is shone along an interior highly polished surface.

As a preliminary matter, it may be seen that by means of the use of the exterior surfaces of the alignment block 158 and individual adjustment of tilt plates 126 and 128, the measuring device 200 may be brought into extremely accurate alignment prior to measuring a trickier interior polished surface.

After doing so, it becomes possible to move to measuring the interior of a necker die 202 or other similar cylindrical polished work piece. The first step is installation of the necker die 202 and necker die fixture 210 into the measuring device.

Figure 13:
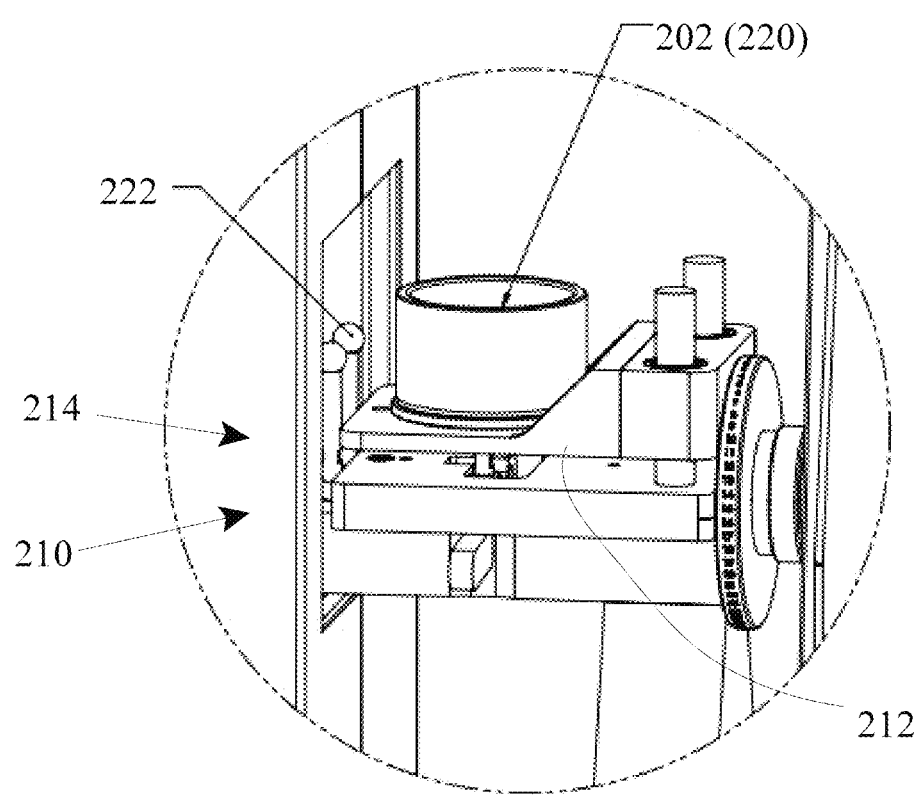
FIG. 13 is an elevated orthogonal detail view of the necker die fixture installed, with a necker die in place and being measured.

FIG. 13 is an elevated orthogonal detail view of the necker die fixture 210 installed, with a necker die 202 in place and being measured. (Unseen within necker die 202, contact arms 220 with probe tips 228 will be used to make an accurate physical contact measurement. These will be shown in later drawings.)

Base 212 holds the necker die 202 onto the fixture 210.

Figure 15:
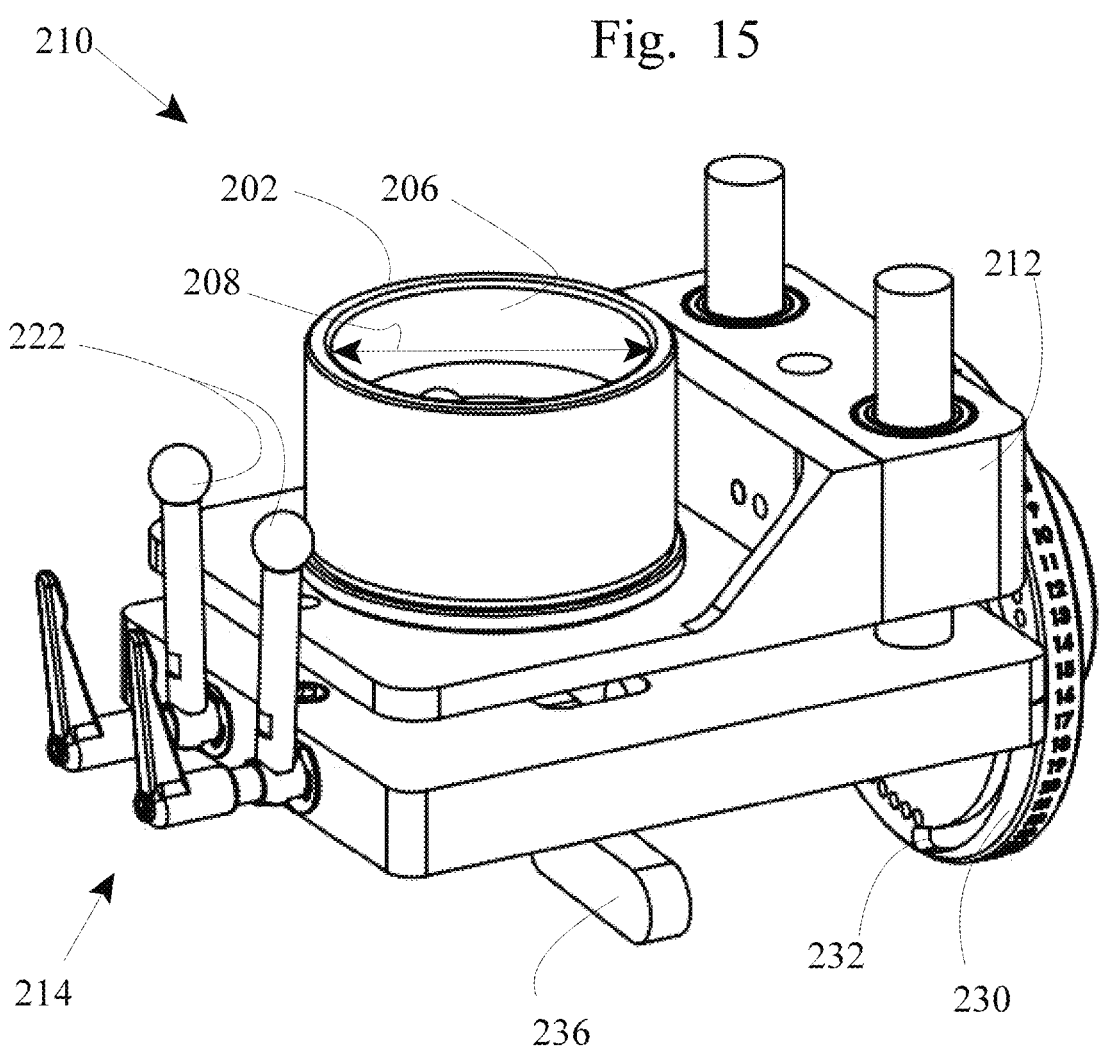
FIG. 15 is an elevated orthogonal view of the necker die fixture, with a necker die installed but with the invention removed for clarity from the tool measuring apparatus.

The combination of interior, contact arms 220 and exterior non-contact arms 222 creates pantograph 214, which may accurately measure the interior diameter 208 seen in FIG. 15.

FIG. 15 is an elevated orthogonal view of the necker die fixture 210, with a necker die 202 installed on base 212 but with the invention removed for clarity from 200, the tool measuring apparatus (thus only the die, fixture/pantograph are seen).

Interior surface 206 my have a diameter 208. Note that in practice, a second, somewhat smaller diameter may actually be measured. (In this diagram a portion of the transition to the smaller diameter and even a portion of an interior probe may be seen, but they are largely occluded and much more easily seen in later numbered drawings of this application document.)

Weight 236, height adjustment wheel 230, spiral slot 232 and pantograph equipment 214 may all be seen. A vertical view is seen next.

Figure 16:
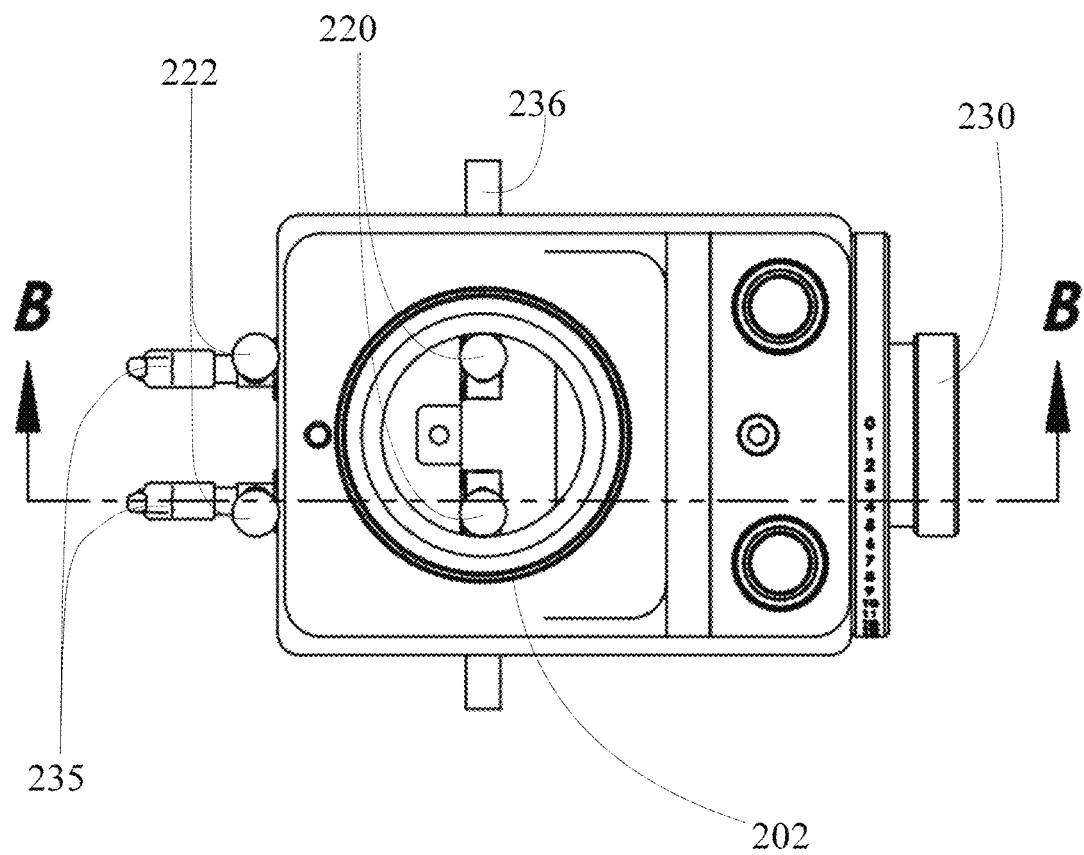
FIG. 16 is a top view of the necker die fixture with a necker die installed.

FIG. 16 is a top view of the necker die fixture with a necker die installed. Both the interior arms 220 and the exterior (non-contact) arms 222 may be seen, as well as manual levers 235.

It is noticeable that the interior arms 220 line up with the exterior arms 222. This is not coincidence, the two sets (pluralities) of arms and probes are in fact connected mechanically by an axle which runs along section line B-B.

Figure 17:
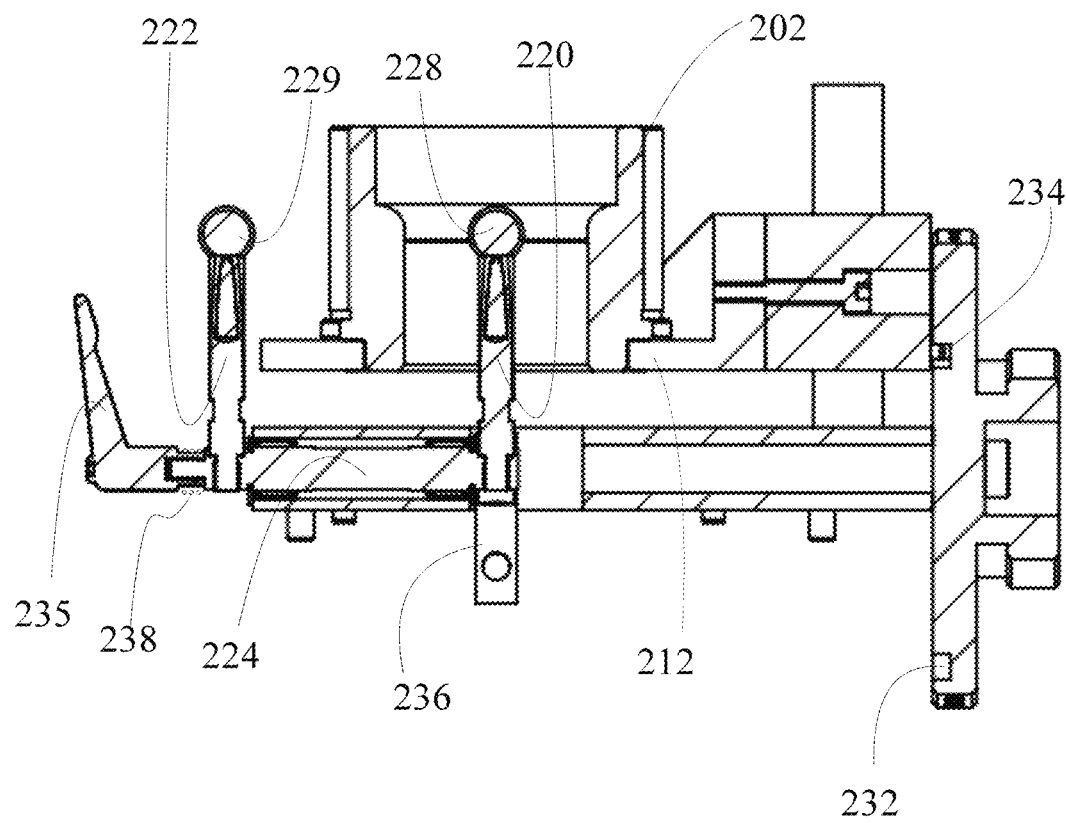
FIG. 17 is a sectional side view of the necker die fixture of the invention with the die installed, showing in particular the connection of the inner (contact) and outer (non-contact) probes, with the lever connection shown as well.

FIG. 17 shows this mechanical linkage in a sectional side view of the necker die fixture 210 of the invention with the die 202 installed, showing in particular the connection of the inner (contact/220) and outer (non-contact/222) probes, with the lever 235 and mechanical connection shown as well.

Each interior arm 220 is terminated by a contact probe 228, which in the presently preferred embodiment is a sphere, but can be any convenient shape of precisely known dimension and configuration. Similarly, each exterior non-contact optically measurable arm 222 is tipped with a measured probe 229, which will be optically measured by the LED micrometers previously discussed.

The interior arms are not connected to one another, nor are the exterior arms connected to on another. (This may be useful in alternative embodiments but is definitely not preferred at this time.)

However, each interior arm 220 is mechanically linked by axle 224 with a single exterior arm 222, and in addition to manual lever 235 which allows adjustment of the position of the two arms 220 and 222.

Thus, each exterior arm 222 exactly signals the position of an interior arm 220.

In the presently preferred embodiment a straightforward relationship is used: the pantograph is 1:1 scale and the angular position of the inner and outer arms is identical, and the shape of the inner and out arms 220/222 and their probes 228/229 is also identical.

Since the exterior arms 222 project into the light beams of the LED micrometers, they can be precisely measured. Since they are NOT interior surfaces, the measurement made is as accurate as the alignment previously achieved and described in FIGS. 1 through 11 and 25.

The linked arms 220/222 may be gently biased outward by the use of weights 236, or in an alternative by the use of a spring 238. Note that the use of a spring 238 with a weight 236 is not a presently preferred embodiment, as the weights 236 seem to provide the correct degree of (gentle) torque required.

Finally, the height adjustment wheel spiral slot 232 may be seen, with captive height adjustment pin 234 seen therein.

Figure 18:
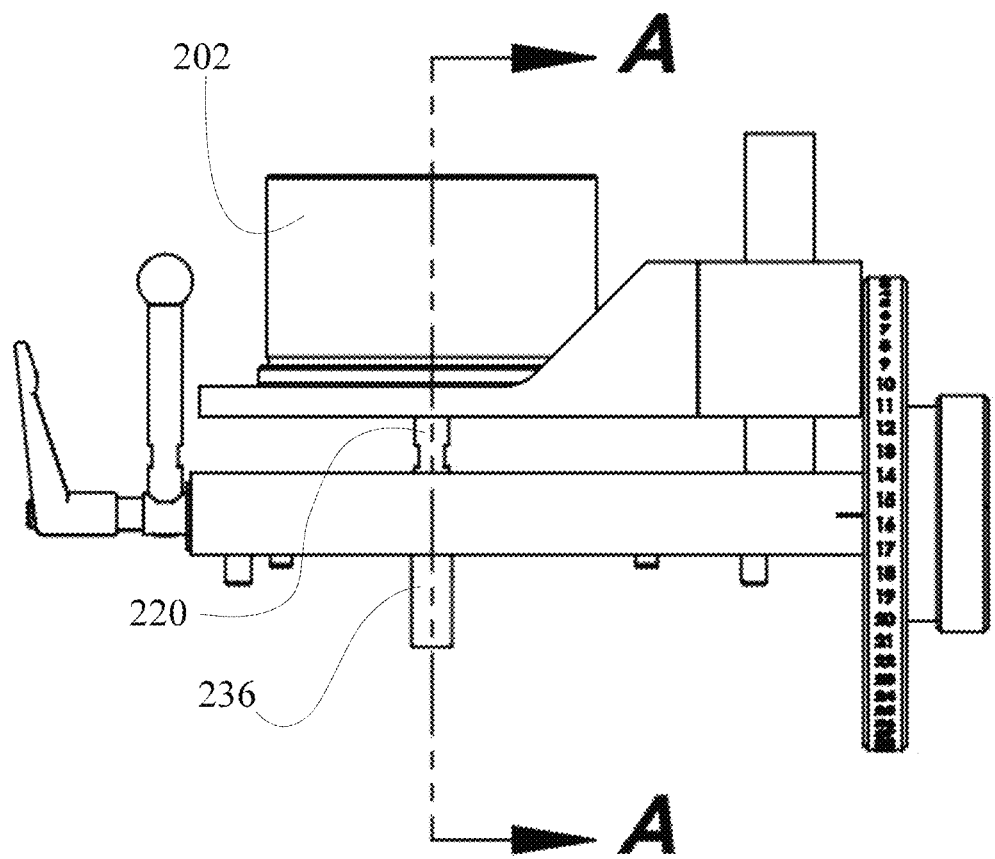
FIG. 18 is a side view of the necker die fixture of the invention with the die installed.

FIG. 18 is a side view of the necker die fixture of the invention with the die installed.

In the gap beneath the base 212, the lower part of arm 220 may be seen. Section A-A will pass directly through this arm and the weight 236 urging it outward.

Figure 19:
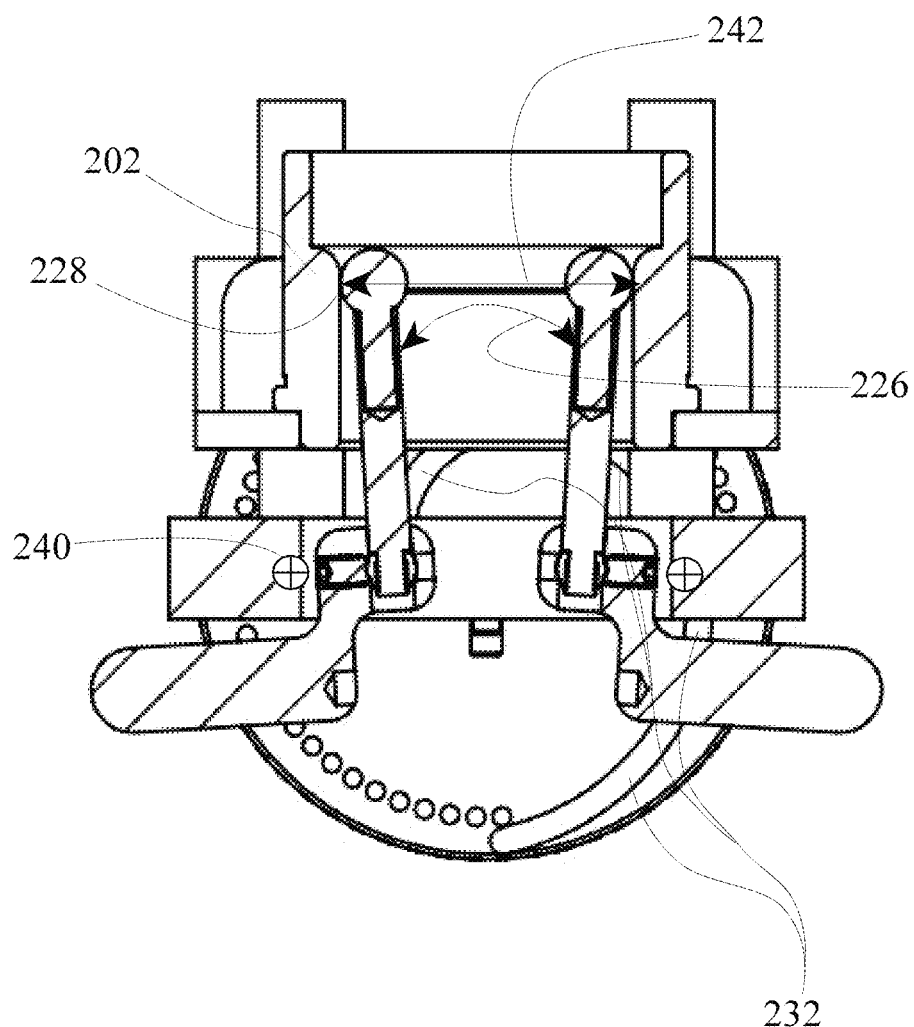
FIG. 19 is an end sectional view of the present invention necker die fixture with the die also sectioned so as to show the contact of the inner probes with the necker surface.

FIG. 19 is an end sectional view along line A-A of the present invention necker die fixture 210 with the die 202 also sectioned so as to show the contact of the inner probes 220 (228) with the necker surface.

As mentioned earlier in passing, the necker die 202 actually has a variable interior diameter and the portion being measured is the lower part, not easily accessible due to not being the top end of the cylinder. This problem is irrelevant in the present invention since the contact probe 228 is atop arm 220 projecting up from the bottom into the necker die 202.

It may be seen that the two arms/probes are in fact measuring the angular separation 226 as well as the quantity of interest, the interior diameter 242. It may also be seen that the two arms of the interior set of arms (the first plurality of arms) are not connected to one another.

The arms are biased outward by their centers of gravity 240, which are external to the axles, and which thus generate a mild torque outward.

In addition, spiral slot 232 is heavily occluded but four different sections of it may be seen in fragments behind the length of the fixture 210.

Figure 20:
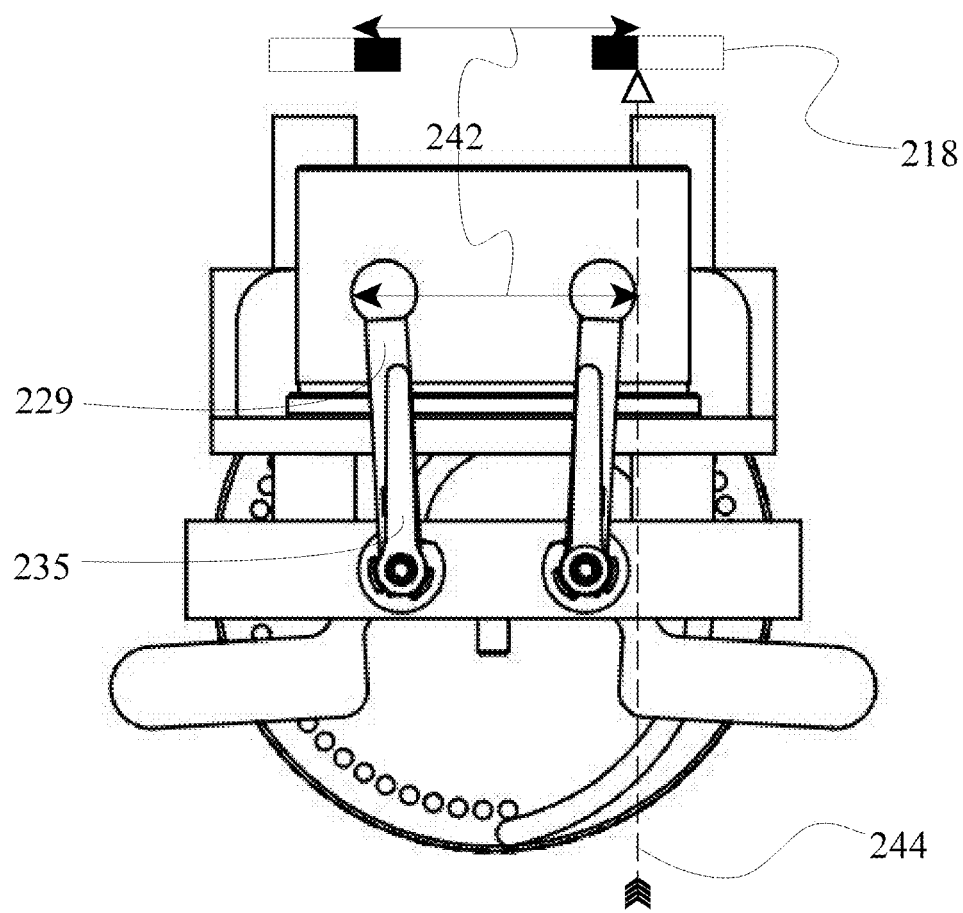
FIG. 20 is an end view, non sectioned, showing the non-contact (outer) probes, levers, weights, the necker die, etc.

FIG. 20 is an end view, non sectioned, showing the non-contact (outer) probes, levers, weights, the necker die, etc.

Interior diameter 242 (refer back to FIG. 19 briefly) has been faithfully replicated by the non-contact probes 229. Light beams 244 have then measured the width of the probes 229 and transmitted it accurately to LED receivers 218, which thus have an accurate optical measurement of interior diameter.

Note that receivers 218 are depicted in conceptual blocks, their actual appearance, unlike FIG. 14 and FIG. 20, is as shown in drawings such as FIGS. 7, 9, etc.

Figure 21:
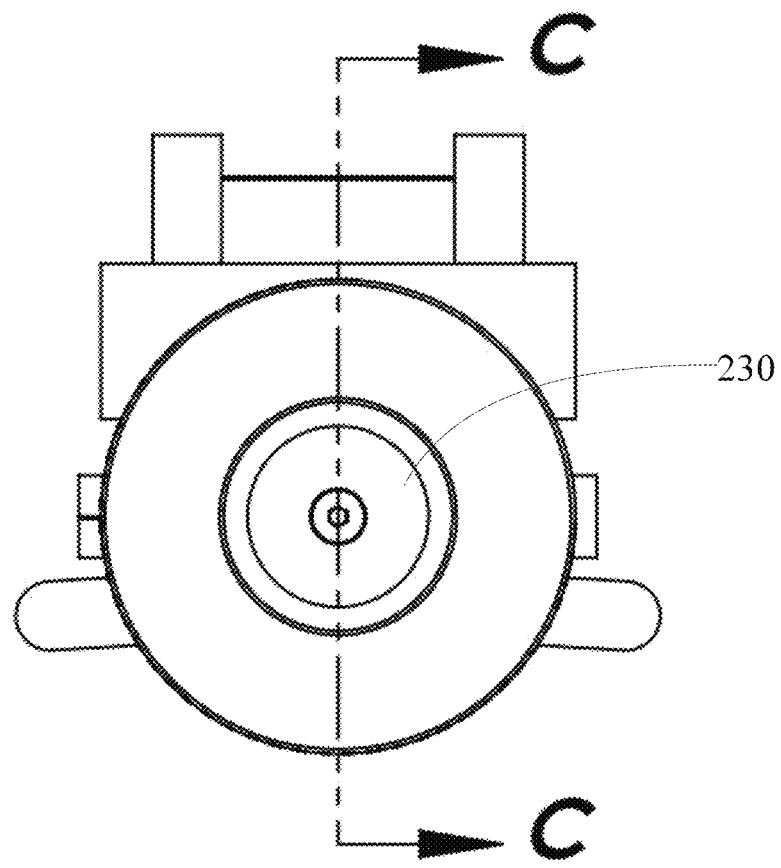
FIG. 21 is a reverse end view showing the height adjustment wheel.

FIG. 21 is a reverse end view showing the height adjustment wheel 230, and further showing section line C-C.

Section line C-C is on the central axis of the necker die fixture 210, unlike section line A-A which was on the axis of the mechanical linkage from the inner to outer arms.

Figure 22:
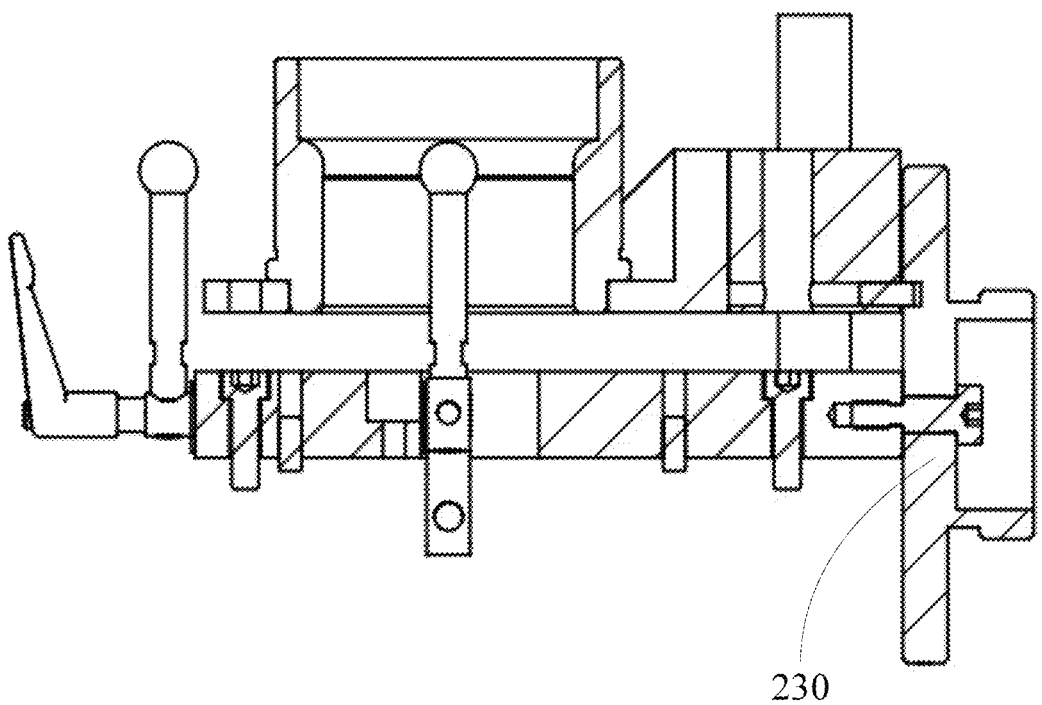
FIG. 22 is a sectional side view showing the length of the invention necker die fixture of the invention. Comparison to the other sectional side view.

FIG. 22 is a sectional side view C-C showing the length of the invention necker die fixture of the invention. Comparison versus FIG. 17 shows further details of the height adjustment wheel, frame, etc. In this case, the axle of the height adjustment wheel 230 may be seen, but the axle of the pantograph ares is no longer seen. With the cutaway view, the distal inner arm may be seen resting in contact with the interior surface of the die.

Figure 23:
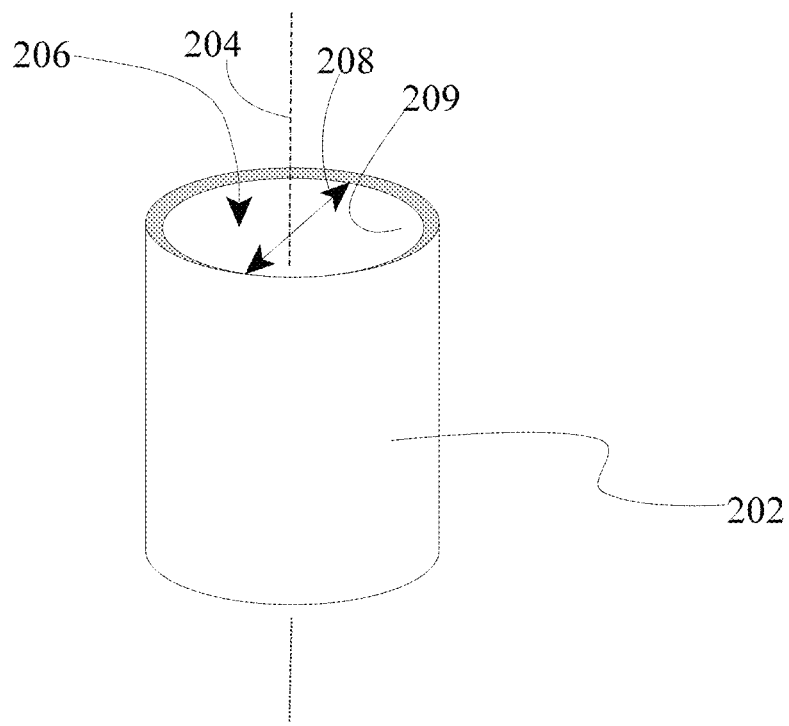
FIG. 23 is an orthogonal view of a necker die, which is PRIOR ART.

FIG. 23 is an orthogonal view of a necker die, which is PRIOR ART. As noted elsewhere, dies, necker dies, punches and other tooling are not claimed as features of the present invention, which interacts with them and is claimed in relation to the relative structures and necessities of the differing devices.

Necker die 202 has an interior 206 and an axis 204. Diameter 208 is not actually the diameter most likely to be of interest for measurement, but the lower down and smaller diameter cannot be seen in normal orthogonal views, so reference to FIG. 22 is suggested for that purpose. Interior surface 209 is high polish, a necessity for efficient production of aluminum cans by means of the tool, but also the source of the long felt commercial need for an efficient way to optically measure necker die interiors.

Figure 24:
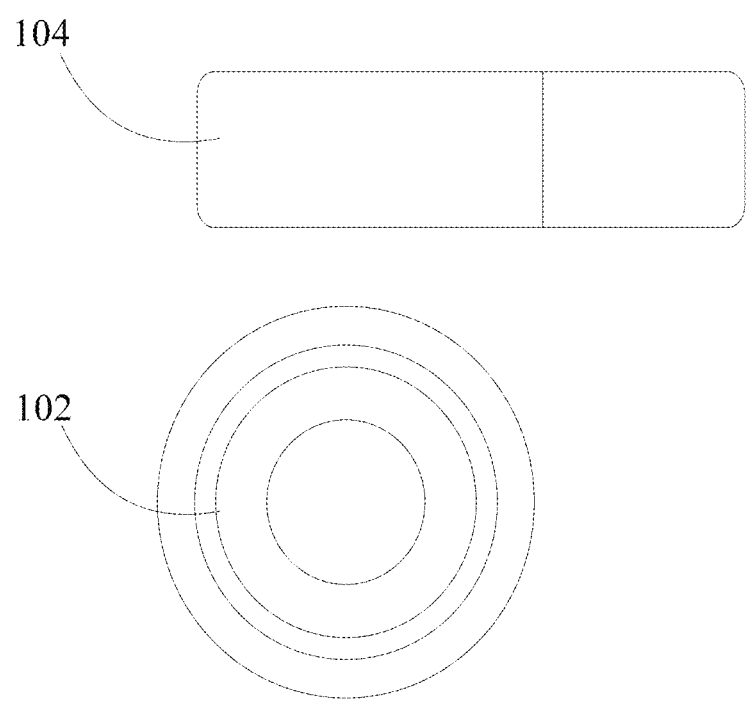
FIG. 24 is an orthogonal view of a die and punch, which are PRIOR ART.

FIG. 24 is an orthogonal view of a die and punch.

The disclosure is provided to render practicable the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

What is claimed is:

1. A measuring device for measuring tools for making cylindrical bodies, such tools including dies and punches, the measuring device comprising:
   a mounting surface having punch and die fixtures attached thereto, the die fixtures dimensioned and configured to allow attachment of such dies thereto and the punch fixtures dimensioned and configured to allow attachment of such punches thereto;
   a plurality of LED micrometer transmitters oriented so as to emit vertical light beams, the vertical light beams partially striking at least one such tool, such one tool casting at least one vertical shadow;
   a plurality of LED micrometer receivers oriented so as to measure the vertical light beams.

2. The measuring device of claim 1, further comprising:
   a carriage frame having a central opening, the central opening having a top and a bottom, a first one of the LED micrometer transmitters mounted by means of a first tilt plate to the carriage frame at one of the central opening top and central opening bottom and a first one of the LED micrometer receivers mounted by means of the first tilt plate to the carriage frame diametrically opposed to the first LED micrometer transmitters, a second one of the LED micrometer transmitters mounted by means of a second tilt plate to the carriage frame at one of the central opening top and central opening bottom and a second one of the LED micrometer receivers mounted by means of the second tilt plate to the carriage frame diametrically opposed to the second LED micrometer transmitters;
   the carriage frame movable and mounted so that the carriage frame central opening passes about the punch and die fixtures during motion,
   whereby:
   the carriage frame central opening passes about such at least one tool during motion.

3. The measuring device of claim 2, wherein the mounting surface further comprises:
   a vibration isolation plate.

4. The measuring device of claim 3, further comprising:
   a first central pin about which the first tilt plate may pivot;
   a second central pin about which the second tilt plate may pivot.

5. The measuring device of claim 4, further comprising:
   a first lever attached to the first tilt plate at a first end of the first lever, whereby when the first lever moves the first tilt plate moves;
   a second lever attached to the second tilt plate at a first end of the second lever, whereby when the second lever moves the second tilt plate moves.

6. The measuring device of claim 5, further comprising:
   a first captive screw passing through a first threaded aperture in a first arm of the first lever, rotation of the first captive screw causing motion of the first arm of the first lever, which motion is mechanically reduced by the first lever to cause corresponding but reduced motion of the first tilt plate;
   a second captive screw passing through a first threaded aperture in a first arm of the second lever, rotation of the second captive screw causing motion of the first arm of the second lever, which motion is mechanically reduced by the second lever to cause corresponding but reduced motion of the second tilt plate.

7. The measuring device of claim 6, wherein the carriage frame is further mounted upon a leadscrew.

8. The measuring device of claim 7, wherein the carriage frame is actuated into motion by a motor.

9. The measuring device of claim 8, further comprising:
   a precision alignment block removably mounted upon the mounting surface at a first place at which the carriage frame central opening may pass about it, the precision alignment block having two sides, the two sides being parallel, whereby a precision alignment block shadow is cast.

10. The measuring device of claim 9, wherein the precision alignment block further comprises:
    a precisely known width dimension, which precisely known width dimension in turn has a maximum error;
    whereby the two tilt plates may be individually adjusted until the vertical beams cast by the LED micrometer transmitters on each plate are parallel to the respective parallel sides of the precision alignment block;
    in turn whereby a maximum beam variation is established based upon the maximum error of the width dimension of the precision alignment block.

11. The measuring device of claim 10, wherein the maximum beam variation is 0.00002 inches over 1 vertical inch.

12. A measuring device for measuring tools for making cylindrical bodies, such tools including cylindrical necker dies having an axis and an interior, such interior having a diameter, the measuring device comprising:
    a mounting surface having a necker die fixture attached thereto, the necker die fixture having a base dimensioned and configured to allow attachment of such necker dies thereto with such axis oriented vertically, the necker die fixture comprising a pantograph;
    a plurality of LED micrometer transmitters oriented so as to emit vertical light beams, the vertical light beams striking a first end of the necker die fixture, the necker die fixture pantograph casting at least one vertical shadow;
    a plurality of LED micrometer receivers oriented so as to measure the vertical light beams.

13. The measuring device of claim 12, further comprising:
    a first plurality of pantograph arms positioned at the base and dimensioned and configured to project into such necker die interior when such necker die is attached to the base;
    a second plurality of pantograph arms projecting from the first end of the necker die fixture into the vertical light beams;
    the first and second plurality of pantograph arms mechanically linked so that they maintain an identical angular orientation.

14. The measuring device of claim 13, further comprising:
a contact probe terminating each pantograph arm.

15. The measuring device of claim 14, wherein the contact probes further comprise: spheres.

16. The measuring device of claim 15, wherein the base further comprises:
a vertical adjustment mechanism having a height selector wheel, the height selector wheel having a spiral lifting slot therein, the spiral lifting slot having a captive lifting pin there, the captive lifting pin being attached to the base; whereby,
when the height selector wheel is turned, the captive lifting pin changes a height of the base.

17. The measuring device of claim 16, wherein the pantograph arms further comprise:
means for urging the pantograph arms apart.

18. The measuring device of claim 17, wherein the means for urging the pantograph arms apart comprise: at least one spring.

19. The measuring device of claim 17, wherein the means for urging the pantograph arms apart comprise: a center of gravity external to the arms.

20. The measuring device of claim 17, further comprising:
at least one handle disposed outside the necker die fixture, the at least one arm mechanically linked to and operative to move at least one of the pantograph arms.

21. The measuring device of claim 17, wherein the first plurality of pantograph arms have a first probe separation distance and the second plurality of pantograph arms have a second probe separation distance, and the first and second probe separation distances have a measured distance ratio.

22. The measuring device of claim 21, wherein the measured distance ratio is 1:1.

23. A measuring device for measuring tools for making cylindrical bodies, such tools including cylindrical necker dies having an axis and an interior, such interior having a diameter, such tools also including dies and punches, the measuring device comprising:
a mounting surface having punch and die fixtures attached thereto, the die fixtures dimensioned and configured to allow attachment of such dies thereto and the punch fixtures dimensioned and configured to allow attachment of such punches thereto;
the mounting surface having a necker fixture attached thereto, the necker die fixture having a base dimensioned and configured to allow attachment of such necker dies thereto with such axis oriented vertically, the necker die fixture comprising a pantograph;
a plurality of LED micrometer transmitters oriented so as to emit vertical light beams and a plurality of LED micrometer receivers oriented so as to measure the vertical light beams;
a carriage frame having a central opening, the central opening having a top and a bottom, a first one of the LED micrometer transmitters mounted by means of a first tilt plate to the carriage frame at one of the central opening top and central opening bottom and a first one of the LED micrometer receivers mounted by means of the first tilt plate to the carriage frame diametrically opposed to the first LED micrometer transmitters, a second one of the LED micrometer transmitters mounted by means of a second tilt plate to the carriage frame at one of the central opening top and central opening bottom and a second one of the LED micrometer receivers mounted by means of the second tilt plate to the carriage frame diametrically opposed to the second LED micrometer transmitters;
the carriage frame movable and mounted so that the carriage frame central opening passes about the punch fixture and die fixture and a first end of the necker die fixture during motion,
when the carriage frame is in a first position the vertical light beams striking a first end of the necker die fixture, the necker die fixture pantograph casting at least one vertical shadow;
when the carriage frame is in a second position the vertical light beams partially striking at least one such tool, such one tool casting at least one vertical shadow;
a first central pin about which the first tilt plate may pivot and a second central pin about which the second tilt plate may pivot;
a first lever attached to the first tilt plate at a first end of the first lever, whereby when the first lever moves the first tilt plate moves;
a second lever attached to the second tilt plate at a first end of the second lever, whereby when the second lever moves the second tilt plate moves;
a first captive screw passing through a first threaded aperture in a first arm of the first lever, rotation of the first captive screw causing motion of the first arm of the first lever, which motion is mechanically reduced by the first lever to cause corresponding but reduced motion of the first tilt plate;
a second captive screw passing through a first threaded aperture in a first arm of the second lever, rotation of the second captive screw causing motion of the first arm of the second lever, which motion is mechanically reduced by the second lever to cause corresponding but reduced motion of the second tilt plate;
a precision alignment block removably mounted upon the mounting surface at a first place at which the carriage frame central opening may pass about it whereby a precision alignment block shadow is cast, the precision alignment block having two sides, the two sides being parallel, the precision alignment block having a precisely known width dimension, which precisely known width dimension in turn has a maximum error, whereby the two tilt plates may be individually adjusted by rotating the first and second captive screws until the vertical beams cast by the LED micrometer transmitters on each plate are parallel to the respective parallel sides of the precision alignment block;
a maximum beam variation established based upon the maximum error of the width dimension of the precision alignment block;
a first plurality of pantograph arms positioned at the base and dimensioned and configured to project into such necker die interior when such necker die is attached to the base;
a second plurality of pantograph arms projecting from the first end of the necker die fixture into the vertical light beams when the carriage frame is in the first position;
a contact probe terminating each pantograph arm;
the first and second plurality of pantograph arms mechanically linked so that they maintain an identical angular orientation, the first and second plurality of pantograph arms having means for urging the first plurality of pantograph arms apart;
the first plurality of pantograph arms have a first probe separation distance and the second plurality of pantograph arms have a second probe separation distance, and the first and second probe separation distances have a measured distance ratio.

* * * * *